United States Patent
Yaworski et al.

(10) Patent No.: US 6,706,968 B2
(45) Date of Patent: Mar. 16, 2004

(54) ENVIRONMENTALLY SEALED WRAP-AROUND SLEEVES HAVING A LONGITUDINAL SEALANT CHAMBER

(75) Inventors: Harry George Yaworski, Apex, NC (US); Sherif I. Kamel, Apex, NC (US); Rudolf Robert Bukovnik, Chapel Hill, NC (US); Kenton Archibald Blue, Fuquay Varina, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/092,200

(22) Filed: Mar. 6, 2002

(65) Prior Publication Data

US 2002/0166691 A1 Nov. 14, 2002

Related U.S. Application Data

(63) Continuation-in-part of application No. 09/556,230, filed on Apr. 24, 2000, now Pat. No. 6,545,219.

(51) Int. Cl.$^7$ ............................................. H02G 15/02
(52) U.S. Cl. ..................................... 174/74 A; 174/93
(58) Field of Search ...................... 174/92, 93, 74 A, 174/77 R, 73.1; 138/164, 166, 167

(56) References Cited

U.S. PATENT DOCUMENTS

| | | | |
|---|---|---|---|
| 4,880,676 A | 11/1989 | Puigcerver et al. | 428/35.7 |
| 4,888,070 A | 12/1989 | Clark et al. | 156/48 |
| 4,944,976 A | 7/1990 | Plummer, III | 428/36.9 |
| 5,099,088 A | 3/1992 | Usami et al. | 174/76 |
| 5,456,959 A | * 10/1995 | Dawes | 428/34.1 |
| 5,505,230 A | 4/1996 | Bartholomew | 138/164 |
| 5,561,269 A | 10/1996 | Robertson et al. | 174/92 |
| 5,824,954 A | 10/1998 | Biche et al. | 174/74 A |

(List continued on next page.)

FOREIGN PATENT DOCUMENTS

| | | | |
|---|---|---|---|
| DE | 130116 | 3/1985 | |
| DE | G9004669.2 | 8/1990 | .......... H02G/15/18 |
| EP | 0319305 A2 | 6/1989 | |
| EP | 0 319 305 | 6/1989 | |
| EP | 0328386 A2 | 8/1989 | |
| EP | 0409444 A2 | 1/1991 | |
| EP | 0 443 152 | 8/1991 | |
| EP | 0695014 A1 | 1/1996 | |
| FR | 2278183 | 7/1975 | |
| GB | 1 506 748 | 4/1978 | |
| WO | 01/82435 | 11/2001 | |

OTHER PUBLICATIONS

"Splice Insulators", T&B, pp. M195 and M196, Jan. 21, 1985.
"Motor Lead Connections (5300 Series)", 3M, pp. 287–290, date unknown.
"Motor Stub Splice Insulator", T&B, pp. D124, D125 and D127, date unknown.

(List continued on next page.)

*Primary Examiner*—Chau N. Nguyen
(74) *Attorney, Agent, or Firm*—Myers Bigel Sibley & Sajovec

(57) ABSTRACT

Wrap-around cable sleeves are provided for environmentally sealing a cable section. The cable sleeves include a wrap-around body member of an electrically insulating material and have a longitudinally extending portion with a corrugated lateral cross-section. The longitudinally extending portion defines a portion of a cable chamber extending around the cable section when the body member is wrapped around the cable section. A closure edge extends along a first longitudinal edge of the body member. A sealant chamber extends along a second longitudinal edge of the body member. The sealant chamber has an opening configured to receive the closure edge when the body member is wrapped around the cable section. A sealant material is positioned in the sealant chamber to environmentally seal the longitudinal edges of the body member when the body member is wrapped around the cable section. Methods of forming wrap-around cable sleeves are also provided.

25 Claims, 24 Drawing Sheets

U.S. PATENT DOCUMENTS

| | | | | |
|---|---|---|---|---|
| 5,824,956 A | * | 10/1998 | Garban et al. | 174/93 |
| 5,828,005 A | | 10/1998 | Huynh-Ba et al. | 174/92 |
| 5,962,811 A | | 10/1999 | Rodrigues et al. | 174/76 |
| 6,265,665 B1 | | 7/2001 | Zahnen | 174/92 |

OTHER PUBLICATIONS

"[Untranslated Japanese language title] PST", 3M, date unknown.

"Motor Lead Splicing", 3M Electrical Products Division, p. 72, date unknown.

"Aerosols & Coatings", 3M Electrical Products Division, p. 39, date unknown.

"Termination, Splicing and Marking", Wesco, p. 5–10, 1993.

International Search Report corresponding to PCT/US 01/12718; Date of Mailing: Oct. 30, 2001.

International Search Report for PCT/US 03/06726.

* cited by examiner

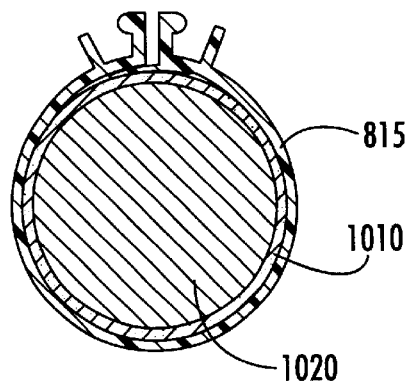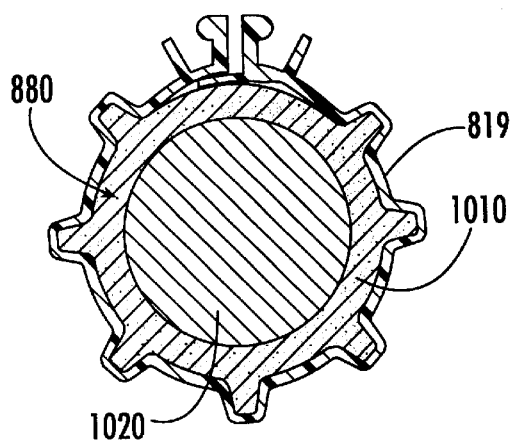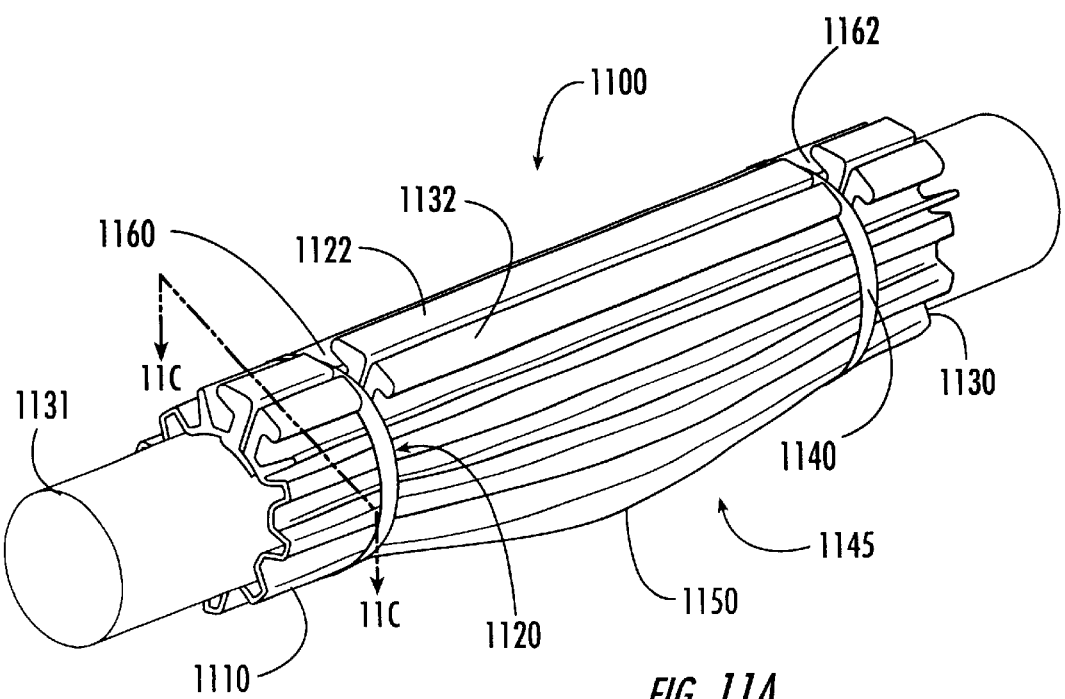

ENVIRONMENTALLY SEALED WRAP-AROUND SLEEVES HAVING A LONGITUDINAL SEALANT CHAMBER

RELATED APPLICATIONS

This is a continuation-in-part application of pending U.S. patent application Ser. No. 09/556,230, filed Apr. 24, 2000 now U.S. Pat. No. 6,545,219, the disclosure of which is incorporated herein by reference in its entirety.

FIELD OF THE INVENTION

This invention relates to sealing of cables. More particularly, this invention relates to wrap-around cable sleeves.

BACKGROUND OF THE INVENTION

In the electrical utilities industry, maintaining cable integrity may be critical. A loss of cable integrity, for example, a short circuit in a high voltage cable, may result in a crippling power outage, or, even worse, a loss of life. One everyday task that may pose a great threat to cable integrity is the formation of electrical connections.

When electrical connections are formed, a bare metal surface may be exposed such as a splice connector. These bare metal surfaces may be particularly hazardous when formed in the field where they are exposed to the environment. This environment may include rocks and other sharp objects as well as moisture when the connection is to be buried under ground and rainfall when the connection is to be suspended in the air. Thus, there is a need to protect such electrical connections from the environment.

U.S. Pat. No. 5,828,005 to Huynh-Ba et al. proposes the use of a gel-filled closure for environmentally protecting a connector forming a connection between a cable and at least one electrical component. The closure may include first and second cavitied bodies, each having two lateral sides and two end sides. The closure may have a hinge joining the first and second bodies along a lateral edge. The closure may be integrally made of a thermoplastic material by injection molding. The thermoplastic material may have a tensile yield strength of at least 3,500 pounds per square inch (psi). The closure may include reinforcing ribs that decrease the deflection in the closure near fingers as the enclosed gel expands during service at elevated temperatures.

While the gel may protect the connection from moisture and the closure may provide protection from rocks and other buried sharp objects, such a solution may ultimately be less than optimal. The reinforcing ribs may need to be designed to withstand a given internal pressure. As a result, valuable engineering resources may need to be expended to create a satisfactory closure. Moreover, standard electrical connectors are typically not used by electrical utilities across the country. Instead, connectors may assume a variety of shapes and sizes. As the above closure may be formed in molds by injection molding, large capital investments may be required to manufacture them. Oftentimes, the ultimate market for these specialty closures may not be large enough to warrant such an investment. Furthermore, the gel may have to be placed in the closures in a discrete step, either in the manufacturing process or in the field, which may be inefficient.

U.S. Pat. No. 4,888,070 to Clark et al. proposes a flexible envelope having therein a sealing material. As noted above, gels may expand when heated causing internal stresses on the flexible envelope. If the flexible envelope is made of an elastomer having sufficient elasticity to absorb the expansion of the gel, the closure may become susceptible to splitting if placed in contact with a sharp object such as a rock. If the flexible envelope is made of a rigid material capable of withstanding such contact, the closure may become susceptible to stresses similar to those encountered by the closure, as noted above. Furthermore, the gel may typically be positioned within the flexible envelope in the field. Providing the gel in a discrete step may be inefficient.

SUMMARY OF THE INVENTION

Wrap-around cable sleeves are provided for environmentally sealing a cable section. The cable sleeves include a wrap-around body member of an electrically insulating material and have a longitudinally extending portion with a corrugated lateral cross-section. The longitudinally extending portion defines a portion of a cable chamber extending around the cable section when the body member is wrapped around the cable section. A closure edge extends along a first longitudinal edge of the body member. A sealant chamber extends along a second longitudinal edge of the body member. The sealant chamber has an opening configured to receive the closure edge when the body member is wrapped around the cable section. A sealant material is positioned in the sealant chamber to environmentally seal the longitudinal edges of the body member when the body member is wrapped around the cable section.

In other embodiments of the present invention, the cable sleeves further include a first sealant material layer on an inner face of the body member at a first end thereof that extends transversely across the first end of body member to define a continuous environmental seal between the cable section and the first end of the body member when the body member is wrapped around the cable section. A second sealant material layer may be provided on the inner face of the body member at a second end thereof, longitudinally spaced apart from the first end to define a gap portion between the sealant material layers. The second sealant material layer extends transversely substantially across the second end of body member to define a continuous environmental seal between the cable section and the second end of the body member when the body member is wrapped around the cable section. The first and second sealant material layer and the sealant material positioned in the sealant chamber, in various embodiments, sealingly contact each other when the body member is wrapped around the cable section.

In further embodiments of the present invention, the sealant chamber includes a first opening in the inner face of the body member at the first end of the body member and a second opening at the second end. The sealant material in the sealant chamber and the first sealant material layer sealingly contact each other through the first opening and the sealant material in the sealant chamber and the second sealant material layer sealingly contact each other through the second opening.

In other embodiments of the present invention, restraint members are tightened around the first end and the second end of the body member when the body member is wrapped around the cable section to place the sealant material layer under pressure in a radial direction. The body member may include a first slot in an outer face of the first end of the body member and a second slot in the outer face of the second end of the body member and the first and second restraint members may be positioned in respective ones of the slots when the body member is wrapped around the cable section.

In further embodiments of the present invention, the closure edge and the sealant chamber each include a contact surface on the inner face of the body member configured to contact the cable section to faciliate sliding thereon while the body member is wrapped around the cable section. The closure edge may also include a locking member configured to engage a mating portion of the sealant chamber to connect the closure edge and the sealant chamber when the body member is wrapped around the cable section. The longitudinally extending portion with a corrugated lateral cross-section may be a first polymer having an associated rigidity and the locking member and the mating portion of the sealant chamber may be a second polymer that provides the locking member and the mating portion of the sealant chamber a greater rigidity than the longitudinally extending portion. The first polymer may be a thermoplastic elastomer and the second polymer may be polypropylene. The body member may be co-extruded thermoplastic elastomer and polypropylene materials.

In other embodiments of the present invention, the inner face of the body member includes a gap portion between the longitudinally spaced apart first and second sealant material layers without sealant material thereon. The sealant material and the first and second sealant material layers environmentally seal the cable chamber when the body member is wrapped around the cable section. The cable chamber may have a range taking in a radial direction of at least about 15 percent and the longitudinally extending portion with a corrugated lateral cross-section may have a flexural modulus of between about 4,000 and 100,000 psi.

In further embodiments of the present invention, the sealant material and the first and second sealant material layers are a silicone gel. The closure edge is configured to place the silicone gel in the sealant chamber under compression when the body member is wrapped around the cable section and the closure edge is received in the opening of the sealant chamber.

In other embodiments of the present invention, the body member also includes a first collar portion adjacent a first end of the cable chamber and a second collar portion adjacent a second end of the cable chamber. The first and second collar portions have a range taking in a radial direction of less than 10 percent. The cable chamber may have a range taking in the longitudinal direction of less than about 10 percent. The longitudinally extending portion may have a 100% tensile modulus of between about 250 psi and 3000 psi. The longitudinally extending portion may have a tension set less than about 60 percent.

In further embodiments of the present invention, wrap-around cable sleeves are provided for environmentally sealing a cable section. A wrap-around body member of an electrically insulating material and having a longitudinally extending portion with a corrugated lateral cross-section is provided. The longitudinally extending portion defines a portion of a cable chamber extending around the cable section when the body member is wrapped around the cable section. A closure edge extends along a first longitudinal edge of the body member and a sealant chamber extends along a second longitudinal edge of the body member. The sealant chamber has an opening configured to receive the closure edge when the body member is wrapped around the cable section. A silicone gel is positioned in the sealant chamber to environmentally seal the longitudinal edges of the body member when the body member is wrapped around the cable section. The closure edge is configured to place the silicone gel in the sealant chamber under compression when the body member is wrapped around the cable section and the closure edge is received in the opening of the sealant chamber.

A first sealant material layer is positioned on an inner face of the body member at a first end thereof and extends transversely across the first end of body member to define a continuous environmental seal between the cable section and the first end of the body member when the body member is wrapped around the cable section. The first sealant material layer sealingly contacts the silicone gel in the sealant chamber. A second sealant material layer is positioned on the inner face of the body member at a second end thereof, longitudinally spaced apart from the first end to define a gap portion therebetween. The second sealant material layer extends transversely across the second end of body member to define a continuous environmental seal between the cable section and the second end of the body member when the body member is wrapped around the cable section. The second sealant material layer sealingly contacts the silicone gel in the sealant chamber.

In other embodiments of the present invention, methods are provided for forming a wrap-around cable sleeve. A web of electrically insulating material is extruded with a longitudinally extending sealant chamber therein. The web is cut to a selected length. A gel is then inserted into the sealant chamber. Gel is also applied to an inner face of the web at a first end thereof and a second end thereof. The applied gel contacts the gel in the sealant chamber at the first end and the second end to form the wrap-around cable sleeve.

BRIEF DESCRIPTION OF THE DRAWINGS

FIGS. 10A and 10B are schematic diagrams illustrating lateral cross-sections of the embodiments illustrated in FIG. 9.

FIGS. 11A, 11B and 11C are schematic diagrams illustrating embodiments of a wrap-around cable sleeve according to the present invention having first and second restraint members positioned in slots.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
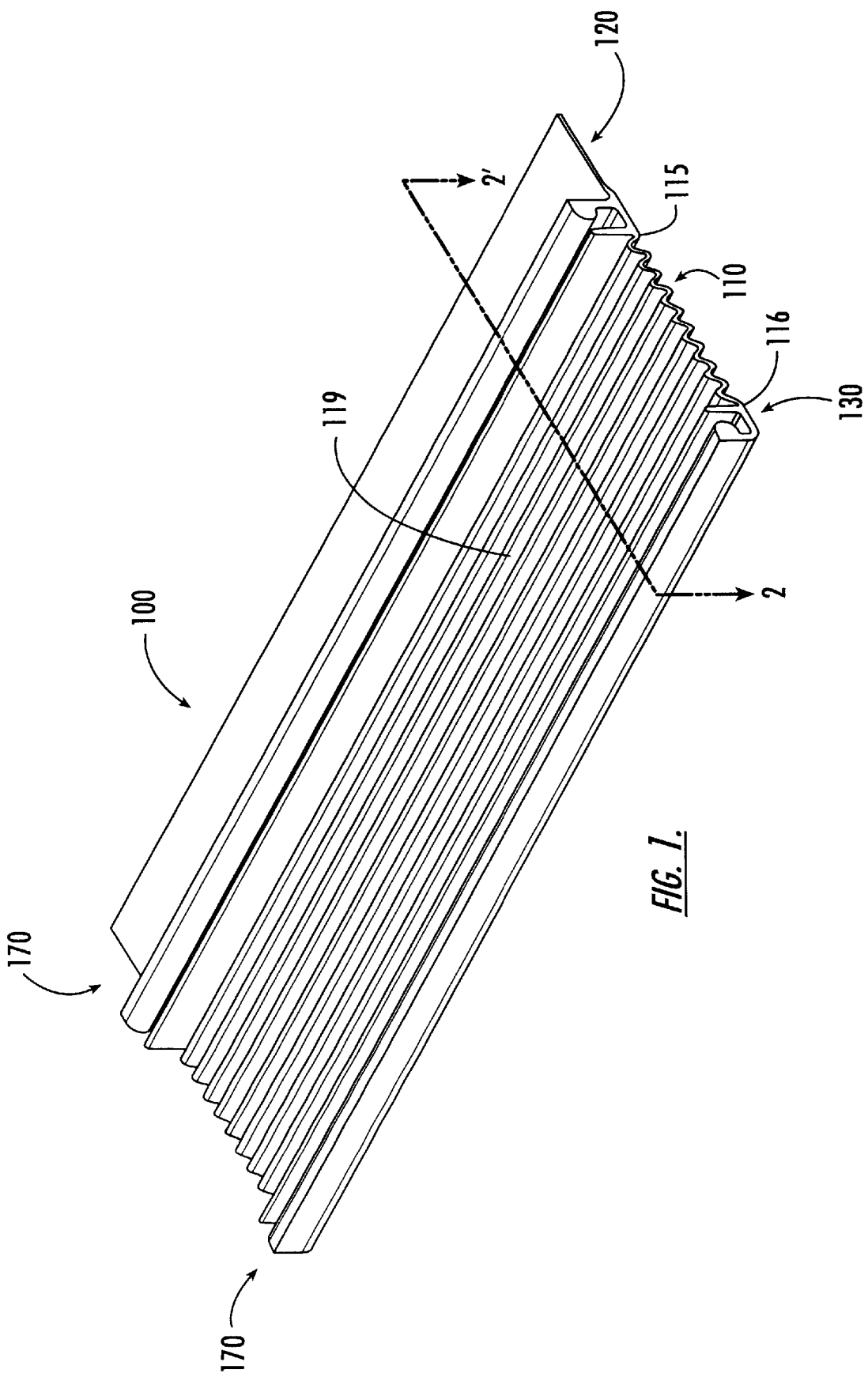
FIG. 1 is a schematic diagram illustrating embodiments of a wrap-around cable sleeve according to the present invention.

Referring to FIG. 1, an embodiment of a wrap-around cable sleeve according to the present invention will now be described. The wrap-around cable sleeve 100 has a longitudinally extending body 110 and a connector 170. The longitudinally extending body 110 includes a longitudinally extending portion 119 having a first longitudinal edge 115 and a second longitudinal edge 116 laterally spaced from the first longitudinal edge 115. The connector 170 includes a first connecting portion 120 adjacent the first longitudinal edge 115 of the longitudinally extending portion 119 and a second connecting portion 130 adjacent the second longitudinal edge 116 of the longitudinally extending portion 119. While the preferred embodiments described herein illustrate specific connecting portion configurations, it is to be understood that various suitable connecting portion configurations understood by those skilled in the art may be used.

The longitudinally extending body 110 as illustrated in FIG. 1 is made from an electrically insulating material. This material may be a variety of electrically insulating materials as will be understood by those skilled in the art including, but not limited to, thermoplastics and thermoplastic elastomers. The electrically insulating material, preferably, is a thermoplastic elastomer. The thermoplastic elastomer may be various thermoplastic elastomers as will be understood by those skilled in the art, and is preferably selected from the group consisting of polypropylene/rubber blends and polyurethanes. The most preferable thermoplastic elastomers are the polypropylene/rubber blends commercially available from Advanced Elastomer Systems of Akron, Ohio and sold under the Santoprene™ trademark. The longitudinally extending portion 119 may have a hardness as measured on the Shore A scale of at least about 55, preferably at least about 80, and more preferably at least about 90. The longitudinally extending portion 119 preferably has a flexural modulus between a lower limit and an upper limit. The lower limit is preferably about 2,000 psi, more preferably about 4,000 psi, and most preferably about 6,000 psi. The upper limit is preferably about 100,000 psi, more preferably about 25,000 psi, and most preferably about 10,000 psi. The longitudinally extending portion 119 preferably has a 100% tensile modulus as measured using ASTM D412 between a lower limit and an upper limit. The lower limit is preferably about 250 psi, more preferably about 800 psi, and most preferably about 1300 psi. The upper limit is preferably about 3000 psi, more preferably about 1800 psi, and most preferably about 1600 psi. The longitudinally extending portion 119 preferably has a tension set as measured using ASTM D412 of less than about 60 percent, more preferably less than about 50 percent, and most preferably less than about 20 percent. The longitudinally extending portion 119 may preferably have a lateral range taking, as described below in FIG. 13, of at least about 15%, more preferably of at least about 30%, and most preferably of at least about 50%. The longitudinally extending portion 119 may preferably have a longitudinal range taking, as described below in FIG. 14, of less than about 10%, more preferably less than about 5%, and most preferably less than about 2%.

Figure 2:
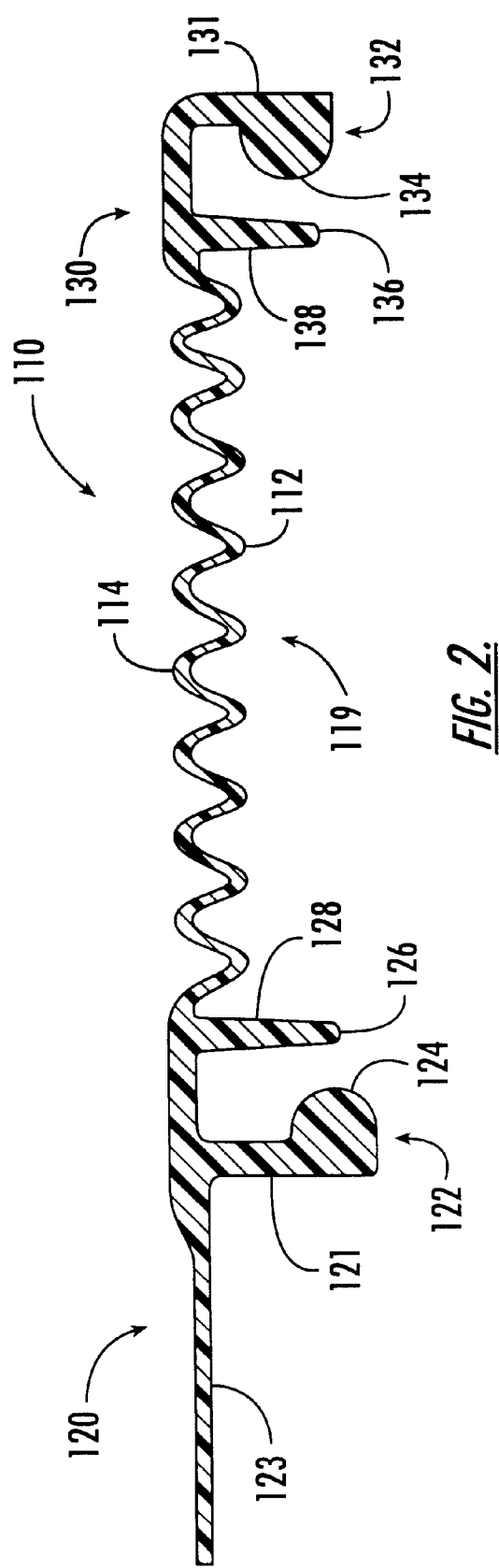
FIG. 2 is a schematic diagram illustrating a lateral cross-section of the embodiment illustrated in FIG. 1.

Referring now to FIG. 2, a lateral cross-section of the embodiments illustrated in FIG. 1 will now be described.

The longitudinally extending portion 119 has a corrugated lateral cross-section. The longitudinally extending portion 119 has an exterior side 112 and an interior side 114. While the illustrated embodiment of FIG. 2 contains a longitudinally extending portion 119 having a W-shaped zig-zag pattern, it is to be understood that corrugated lateral cross-sections of the present invention should not be limited to any particular corrugated pattern.

As shown in FIG. 2, the first connecting portion 120 has a first upright member 122 coupled to and extending from an exterior side of the first connecting portion 120. The first upright member 122 has an increased lateral cross-section at its distal (furthest from the connecting portion 120) end having an engaging surface 124. The first upright member 122 also has a closure side 121. The first connecting portion 120 also has a grip member 126 having a grip surface 128.

As illustrated in FIG. 2, the second connecting portion 130 has a second upright member 132 coupled to and extending from an exterior side of the second connecting portion 130. The second upright member 132 has an increased lateral cross-section at its distal end 134. The second upright member also has a closure side 131. The second connecting portion 130 further has a grip member 136 having a grip surface 138. While the illustrated embodiments of FIGS. 1, 6 and 8 contain first and second connecting portions having grip members, it is to be understood that connecting portions according to the present invention do not require grip members.

The first connecting portion 120, as shown in FIG. 2, has a lip member 123. The lip member 123 may act as a guide to facilitate alignment of the first and second upright members 122 and 132, respectively, when the body 110 is wrapped around a cable section. Moreover, the lip member 123 may also act as a moisture barrier, which may reduce the amount of moisture that enters a cable chamber formed by the longitudinally extending portion 119 when the body 110 is wrapped around a cable section. Furthermore, the lip member 123 may prevent sealant material from entering between closure sides 121 and 131 of upright members 122 and 132, respectively, which may otherwise occur when a wrap-around cable sleeve having sealant material thereon is wrapped around a cable section. Although the illustrated embodiments of FIGS. 1, 6 and 8 contain lip members, it is to be understood that connecting portions according to the present invention do not require lip members. Wrap-around cable sleeves of the present invention may be provided as part of a kit for environmentally sealing a cable section. The kit may also include sealant material, among other things, which may be desired when the wrap-around cable sleeve is not provided with sealant material thereon.

Turning now to FIGS. 3A and 3B, the embodiments of FIG. 1, positioned to define a cable chamber and further having a connector including a connecting member, will now be further described. As illustrated in FIG. 3A, a connector 370 includes the first connecting portion 122, the second connecting portion 132, and a longitudinally extending sleeve element 300. The body 110 may be wrapped around a cable section by positioning the closure side 121 of the first upright member 122 of the first connecting portion 120 adjacent the closure side 131 of the second upright member 132 of the second connecting portion 130. The grip member 126 and the grip member 136 may aid in this positioning. When the body 110 is wrapped around a cable section, the longitudinally extending portion 119 defines a portion of a cable chamber 180. The cable chamber 180 extends substantially around the cable section. The exterior side 112 of the longitudinally extending portion 119 defines a portion of the exterior surface of the cable chamber and the interior side 114 of the longitudinally extending portion 119 defines a portion of the interior side of the cable chamber 180.

As shown in FIG. 3A, the longitudinally extending sleeve element 300 may be used as a connecting member to connect the first connecting portion 120 to the second connecting portion 130. The longitudinally extending sleeve element 300 has an inner surface 310 configured to slidably engage the distal end 124 of the first upright member 122 and an inner surface 320 configured to slidably engage the distal end 134 of the second upright member 132. The longitudinally extending sleeve element 300 has a plurality of sections 330 separated by gaps 340. While embodiments of the longitudinally extending sleeve element 300 as illustrated in FIG. 3A have a plurality of sections 330 separated by gaps 340, it is to be understood that longitudinally extending sleeve elements of the present invention may have other configurations as will be understood by those skilled in the art. For example, the longitudinally extending sleeve element of the present invention may be a longitudinally extending corrugated tube having a longitudinally extending slit along its length. As illustrated in FIG. 3B, the sections 330 are connected to one another at edges 350 and 351. The longitudinally extending sleeve element 300 may comprise various rigid materials, including but not limited to, thermosetting plastics, metals, and rigid thermoplastics having a heat deflection temperature greater than about 90° C. The longitudinally extending sleeve element 300 preferably comprises metal and more preferably comprises stainless steel.

The present invention will now be described with reference to the lateral cross-section of FIG. 4. The wrap-around cable sleeve 400 includes a longitudinally extending body 410 and a connector 470. The longitudinally extending body 410 includes a longitudinally extending portion 419 having a first longitudinal edge 415 and a second longitudinal edge 416 laterally spaced from the first longitudinal edge 415. The connector 470 includes a first connecting portion 420 adjacent the first longitudinal edge 415, and a second connecting portion 430 adjacent the second longitudinal edge 416. The first connecting portion 420 has a first upright member 422 with an increased lateral cross-section at its distal end 424. The second connecting portion 430 has a second upright member 432 with an increased lateral cross-section at its distal end 434. The connector 470 includes a spring clamp connecting member 440. The spring clamp connecting member 440 has a first arm 441 and a second arm 442. The first arm 441 has a first end 443 and a second end 445 opposite the first end 443. The second arm 442 has a first end 444 and a second end 446 opposite the first end 444. The first arm 441 is coupled to the second arm 442 by a spring member 447 such that the spring member 447 causes the first end 443 of the first arm 441 to be directed toward the first end 444 of the second arm 442. The spring clamp 440 may be positioned adjacent the longitudinally extending body 400 such that the first end 443 of the first arm 441 is adjacent the first upright member 422 and the first end 444 of the second arm 442 is adjacent the second upright member 432 such that the first upright member 422 and the second upright member 432 are held in close proximity to one another. Spring clamps of the present invention may be made from a variety of materials as will be understood by those skilled in the art. For example, spring clamps may comprise metals and thermosetting plastics. Spring clamps are preferably metal, and more preferably comprise stainless steel. Spring clamps of the present invention may extend substantially entirely along the length of the longitudinally extending body or a plurality of longitudinally spaced spring clamp connectors may be used.

Figure 5A:
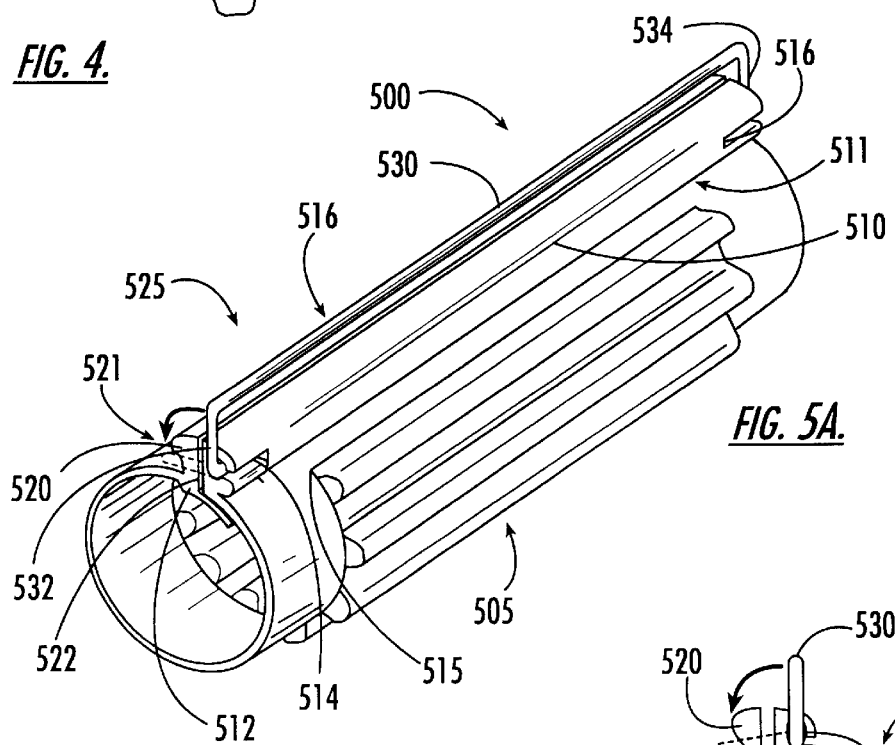
FIGS. 5A and 5B are schematic diagrams illustrating embodiments of a wrap-around cable sleeve according to the present invention having a la
Figure 5B:
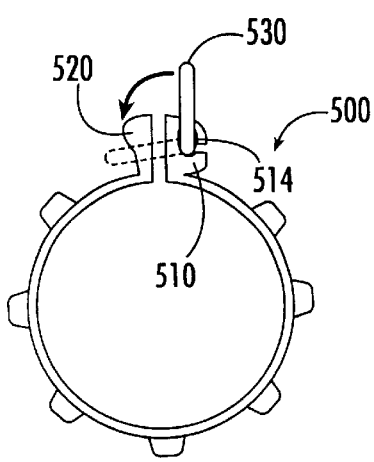

Referring now to FIGS. 5A and B, embodiments of a wrap-around cable sleeve according to the present invention having a latching connector will now be described. FIG. 5B illustrates a lateral cross-section of illustrated embodiment of FIG. 5A. As shown in FIG. 5A, a wrap-around cable sleeve 500 has a longitudinally extending body 505 and a connector 525. The longitudinally extending body 505 has a first longitudinal edge 515 and a second longitudinal edge 516 laterally spaced from the first longitudinal edge 515. The connector 525 has a first connecting portion 511 adjacent the first longitudinal edge 515, and a second connecting portion 521 adjacent the second longitudinal edge 516. The first connecting portion 511 has a first upright member 510, and the second connecting portion 521 has a second upright member 520. The first upright member 510 has a closure side 512 and the second upright member 520 has a closure side 522. The longitudinally extending body 505 is wrapped around a cable section such that the closure side 512 of the first upright member 510 is adjacent the closure side 522 of the second upright member.

As shown in FIGS. 5A and 5B, the connector 525 has a latch member 530. The latch member 530 has a first latch end 532 and a second latch end 534 longitudinally spaced from the first latch end 532. The first latch end 532 is rotatably connected to the first upright member 510 at a first connection point 514. The second latch end 534 is rotatably connected to the first upright member 510 at a second connection point 516 longitudinally spaced from the first connection point 514. The latch member 530 is configured to engage the second upright member 520 when the latch member 530 is rotated to a position adjacent the second upright member 520, as illustrated by the broken lines in FIGS. 5A and 5B. Latch members of the present invention may be made from various rigid materials as will be understood by those skilled in the art. For example, latch members may be made from thermosetting plastics, metals, and rigid thermoplastics having heat deflection temperatures greater than about 90° C. Latch members of the present invention are preferably metal, more preferably stainless steel.

Figure 3:
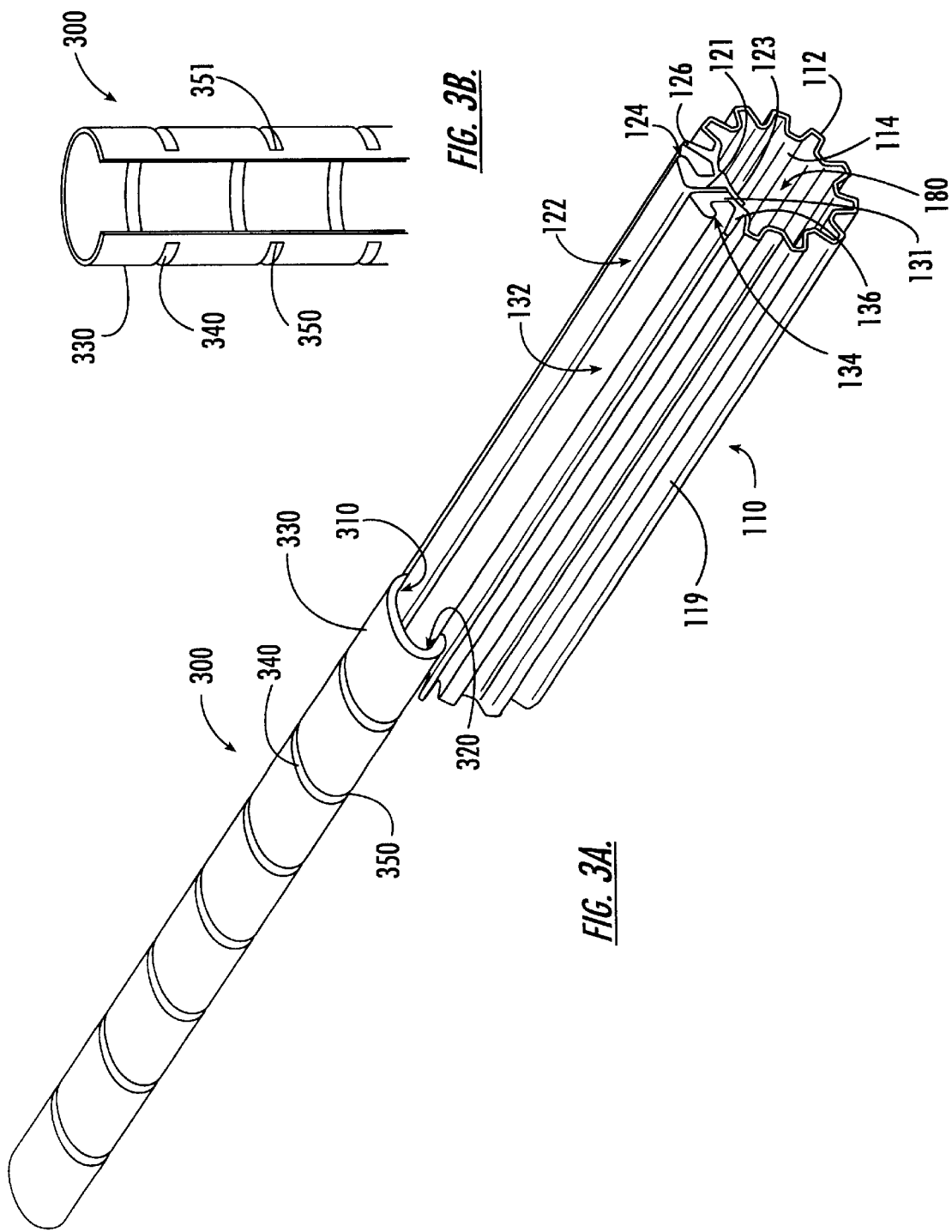
FIGS. 3A and 3B are schematic diagrams illustrating the embodiments illustrated in FIG. 1 in a position defining a cable chamber.
Figure 4:
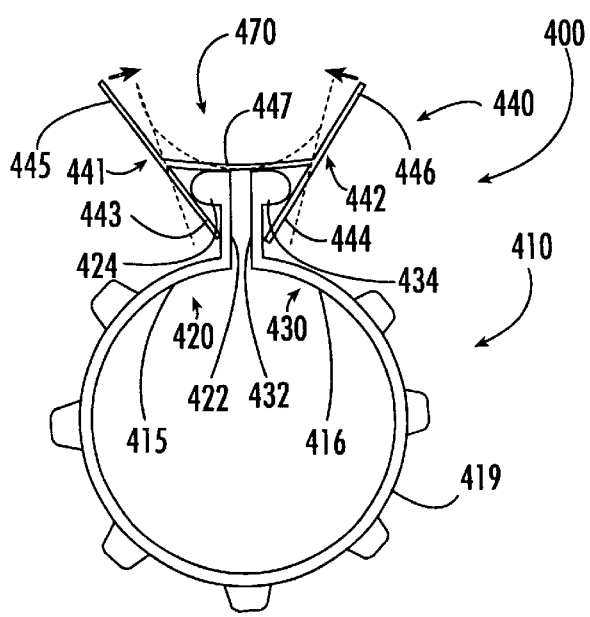
FIG. 4 is a schematic diagram illustrating a lateral cross-section of embodiments of a wrap-around cable sleeve according to the present invention including a spring clamp connector.

Although the illustrated embodiments of FIGS. 3–5 have shown particular mechanical connectors, it is to be understood that connectors of the present invention may be any suitable connector as will be understood by those skilled in the art. For example, connectors of the present invention may be mechanical connectors having different configurations, chemical connectors (e.g., adhesives), and the like.

Figure 6:
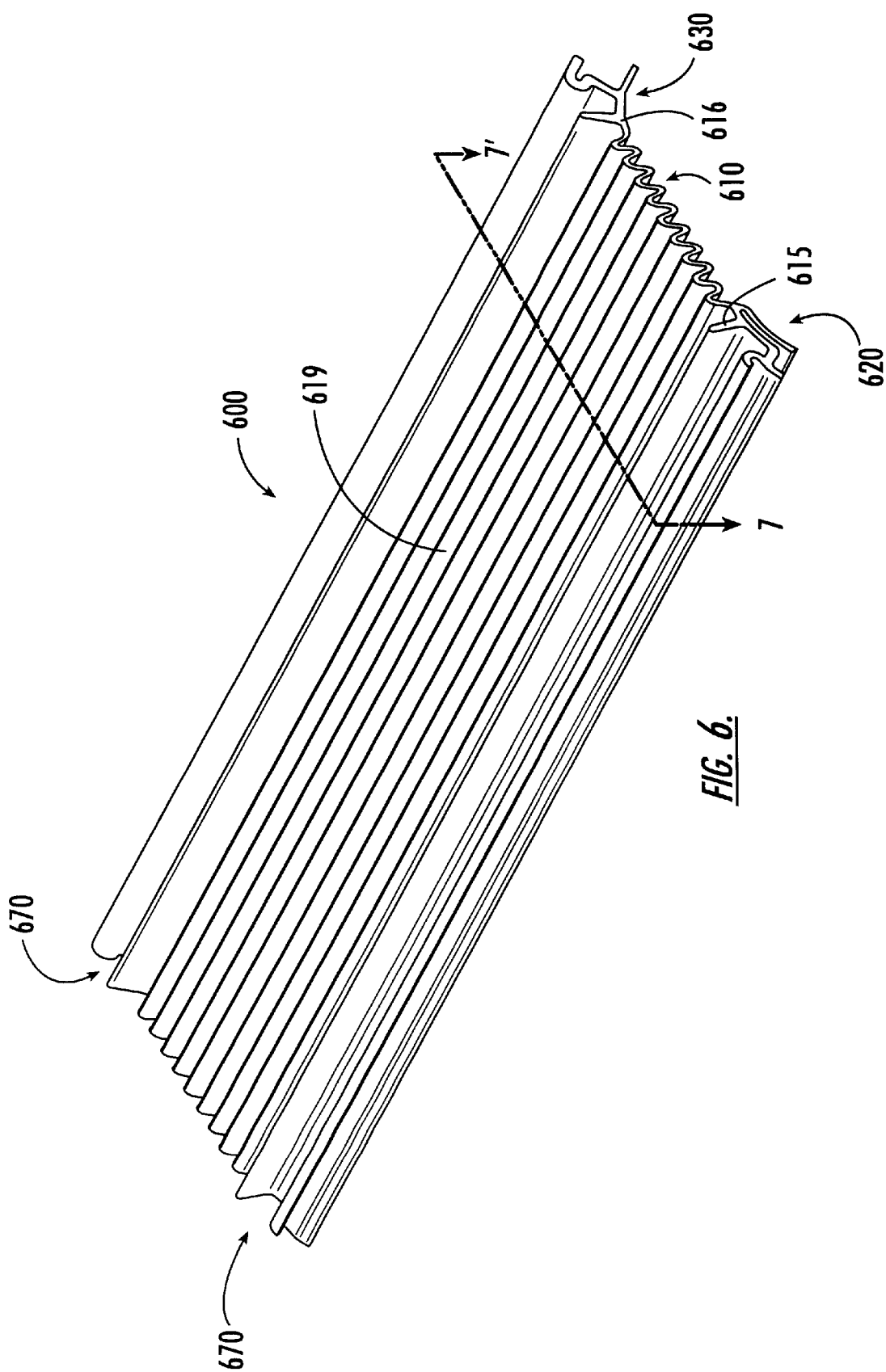
FIG. 6 is a schematic diagram illustrating embodiments of a wrap-around cable sleeve according to the present invention having interlocking upright members.

Referring now to FIG. 6, embodiments of a wrap-around cable sleeve having interlocking upright members according to the present invention will now be described. The wrap-around cable sleeve 600 has a longitudinally extending body 610 and a connector 670. The longitudinally extending body 610 includes a longitudinally extending portion 619 having a first longitudinal edge 615 and a second longitudinal edge 616 laterally spaced from the first longitudinal edge 615. The connector 670 includes a first connecting portion 620 adjacent the first longitudinal edge 615 of the longitudinally extending portion 619, and a second connecting portion 630 adjacent the second longitudinal edge 616 of the longitudinally extending portion 619.

Figure 7:
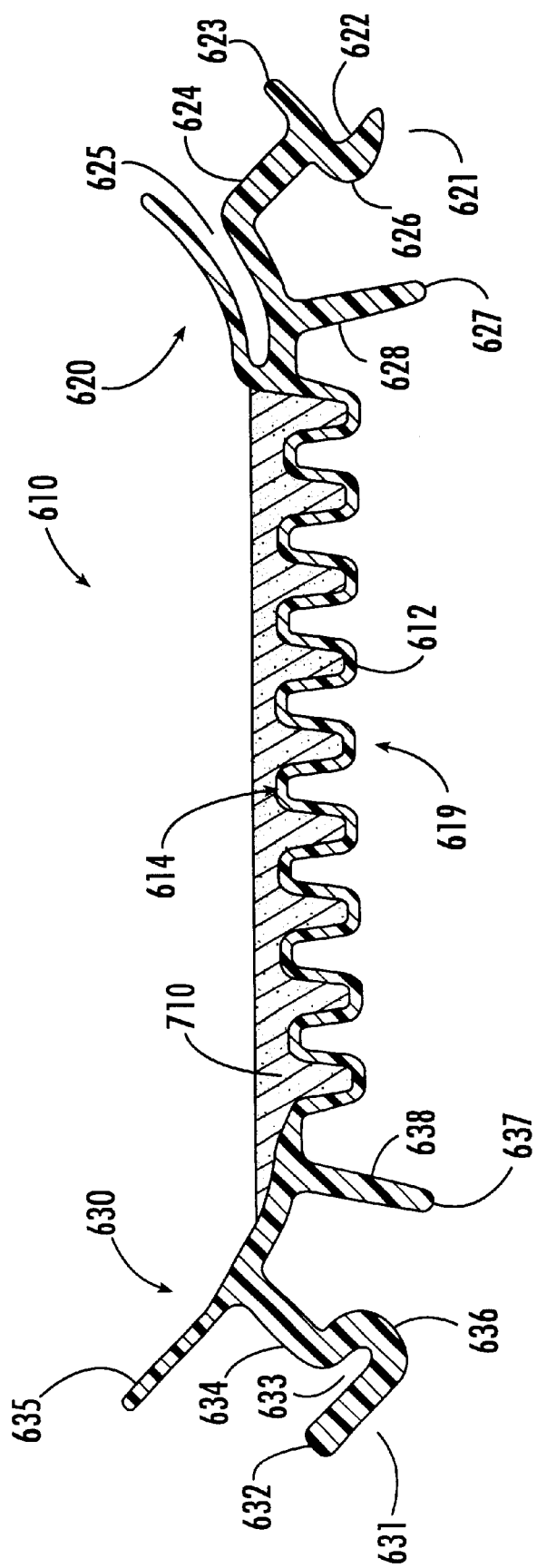
FIG. 7 is a schematic diagram illustrating a lateral cross-section of the embodiments illustrated in FIG. 6 including a sealant material on the interior surface of the longitudinally extending body according to the present invention.

Referring now to FIG. 7, a lateral cross-section of the embodiments illustrated in FIG. 6 will now be described. The longitudinally extending portion 619 has a corrugated lateral cross-section having a generally U-shaped zig-zag pattern. The longitudinally extending portion 619 has an exterior side 612 and an interior side 614. The interior side 614 has a sealant material 710 positioned on it.

As shown in FIG. 7, the first connecting portion 620 has a first upright member 621. The first upright member 621 has a first recess portion 622, a first extending element 623, a closure side 624 and an engaging surface 626. The first connecting portion 620 also has a guide slot 625, and a first grip member 627 having a grip surface 628. The second connecting portion 630 has a second upright member 631. The second upright member 631 has a second extending element 632, a second recess 633, a closure side 634 and an engaging surface 636. The second connecting portion 630 also has a guide member 635, and a second grip member 637 having a grip surface 638.

When the body 610 is wrapped around a cable section, guide member 635 may be inserted into guide slot 625 and first closure side 624 may be positioned adjacent second closure side 634 such that first extension member 623 engages second recess 633 and second extension member 632 engages first recess 622. The first and second upright members 621 and 631 may thus be positioned in an interlocking relationship. A longitudinally extending sleeve element 300 as described above with reference to FIG. 3 may be used to connect the first upright member 621 to the second upright member 631 by slidably engaging the engaging surface 626 of the first upright member 621 and the engaging surface 636 of the second upright member 631 with the longitudinally extending sleeve element 300.

The sealant material 710 may be a variety of sealant materials as will be understood by those skilled in the art including, but not limited to, greases, gels, thixotropic compositions, and mastics. The sealant material is preferably a gel. The term "gel" has been used in the prior art to cover a vast array of materials from greases to thixotropic compositions to fluid-extended polymeric systems. As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the key definition of the solid like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Preferred gels for use in this invention are silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and "Dubrow '300"). These fluid-extended silicone gels may be created with nonreactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is involved in the preparation of these gels, they are sometimes referred to as thermosetting gels. An especially preferred gel is a silicone gel produced from a mixture of divinyl terminated polydimethylsiloxane, tetraks (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetramethylcyclotetrasiloxane (reaction inhibitor for providing adequate pot life).

Other types of gels may be used, for example, polyurethane gels as taught in the aforementioned Debbaut '261 and U.S. Pat. No. 5,140,476 Debbaut (hereinafter "Debbaut '476") and gels based on styrene-ethylene butylenestyrene (SEBS) or styrene-ethylene propylene-styrene (SEPSS) extended with an extender oil of naphthenic or nonaromatic or low aromatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be considered are EPDM rubber based gels, as described in U.S. Pat. No. 5,177,143 to Chang et al. However, these gels tend to continue to cure over time and thus may become unacceptably hard with aging.

Yet another class of gels which may be suitable are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (i.e., Cyasorb UV-53 1, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackfiers and the like described in "Additives for Plastics, Edition 1" published by D.A.T.A., Inc. and The International Plastics Selector, Inc., San Diego, Calif.

The gel has a hardness, as measured by a texture analyzer, preferably between about 5 and 100 grams force, more preferably between about 5 and 60 grams force, and most preferably between about 10 and 40 grams force. The gel has a stress relaxation that is preferably less than about 80%, more preferably less than about 50%, and most preferably less than about 35%. The gel has a tack that is preferably greater than about 1 gram, more preferably greater than about 5 grams, and most preferably between about 10 and 50 grams. As will be understood by those skilled in the art, hardness, tack and stress relaxation may be adjustable for specific applications. The gel has an elongation, as measured according to the procedures of ASTM D-638, of at least 55%, more preferably of at least 500%, and most preferably of at least 1000%. Suitable gel materials include Powergel™ sealant gel available from Tyco Electronics Energy Division of Fuquay-Varina, N.C. under the Raychem™ brand.

The hardness, stress relaxation, and tack may be measured using a Texture Technologies Texture Analyzer TA-XT2 commercially available from Texture Technologies Corp. of Scarsdale, N.Y., or like machines, having a five kilogram load cell to measure force, a 5 gram trigger, and ¼ inch (6.35 mm) stainless steel ball probe as described in Dubrow '300, the disclosure of which is incorporated herein by reference in its entirety. For example, for measuring the hardness of a gel a 60 mL glass vial with about 20 grams of gel, or alternately a stack of nine 2 inch×2 inch×⅛" thick slabs of gel, is placed in the Texture Technologies Texture Analyzer and the probe is forced into the gel at the speed of 0.2 mm per sec to a penetration distance of 4.0 mm. The hardness of the gel is the force in grams, as recorded by a computer, required to force the probe at that speed to penetrate or deform the surface of the gel specified for 4.0 mm. Higher numbers signify harder gels. The data from the Texture Analyzer TA-XT2 may be analyzed on an IBM PC or like computer, running Microsystems Ltd, XT.RA Dimension Version 2.3 software.

The tack and stress relaxation are read from the stress curve generated when the XT.RA Dimension version 2.3 software automatically traces the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force ($F_i$), expressed as a percentage. That is, percent stress relaxation is equal to $$\frac{(F_i - F_f)}{F_i} \times 100\%$$

where $F_i$ and $F_f$ are in grams. In other words the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400 ($10^{-1}$ mm). Harder gels may generally have CP values from about 70 ($10^{-1}$ mm) to about 120 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^1$ mm). For a particular materials system, a relationship between CP and Voland gram hardness can be developed as proposed in U.S. Pat. No. 4,852,646 to Dittmer et al.

Figure 8:
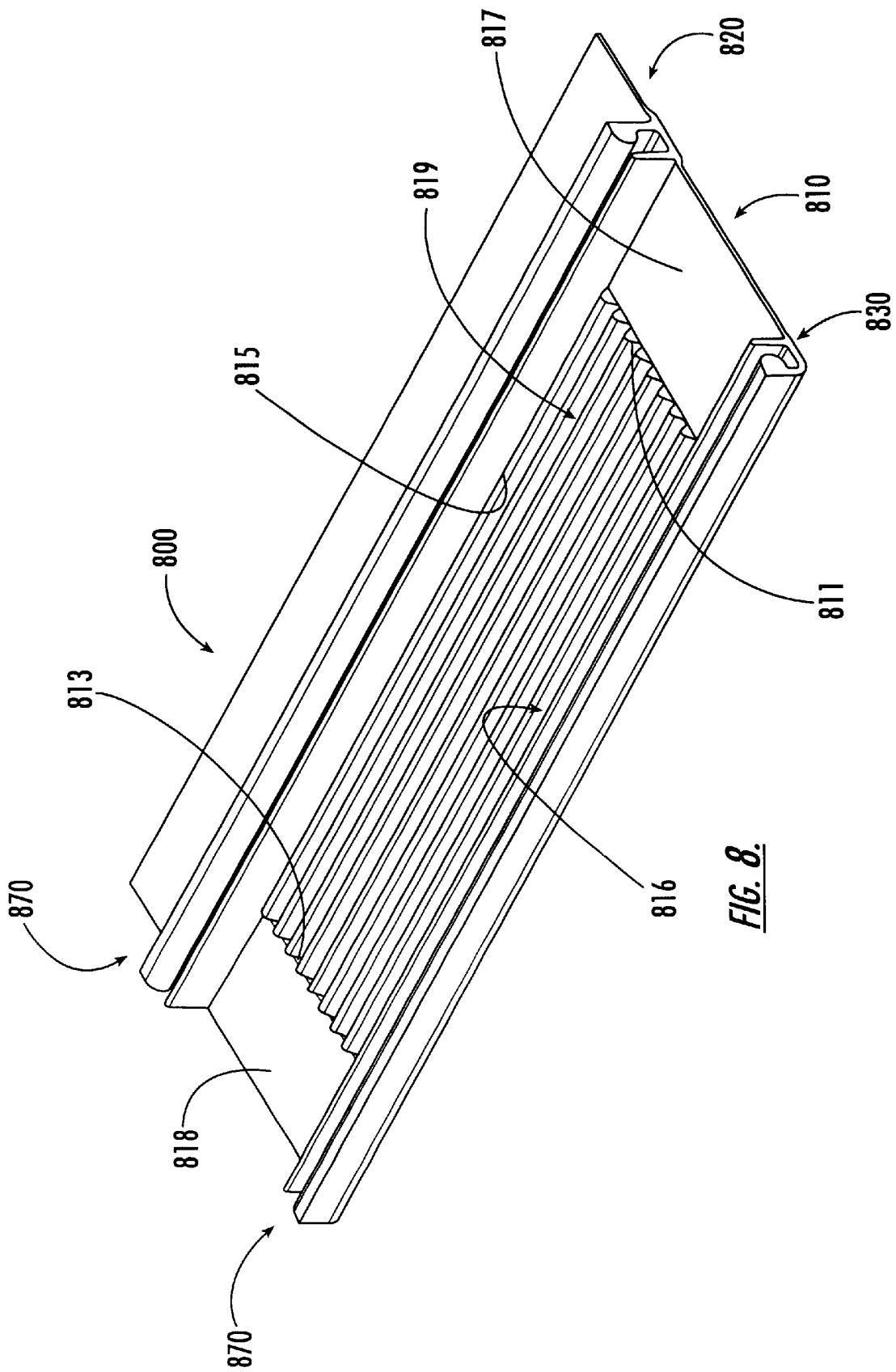
FIG. 8 is a schematic diagram illustrating embodiments of a wrap-around cable sleeve according to the present invention having a longitudinally extending body with substantially flat end portions.

Referring now to FIG. 8, embodiments of a wrap-around cable sleeve according to the present invention having a longitudinally extending body with substantially flat end portions will now be described. The wrap-around cable sleeve 800 has a longitudinally extending body 810 and a connector 870. The longitudinally extending body 810 includes a longitudinally extending portion 819 having a first longitudinal edge 815 and a second longitudinal edge 816 laterally spaced from the first longitudinal edge 815. The connector 870 includes a first connecting portion 820 adjacent the first longitudinal edge 815 of the longitudinally extending portion 819, and a second connecting portion 830 adjacent the second longitudinal edge 816 of the longitudinally extending portion 819.

As shown in FIG. 8, the longitudinally extending body 800 also includes a first end portion 817 adjacent the first end 811 of the longitudinally extending portion 819 and extending from the first connecting portion 820. The longitudinally extending body 810 also includes a second end portion 818 adjacent the second end 813 of the longitudinally extending portion 819 and extending from the first connecting portion 820. The first and the second end portions 817 and 818, respectively, preferably have substantially flat lateral cross sections. The first and the second end portions 817 and 818, respectively, each preferably have a lateral range taking, as described below with reference to FIG. 13, of less than about 10%, more preferably less than about 5%, and most preferably less than about 2%.

Figure 9:
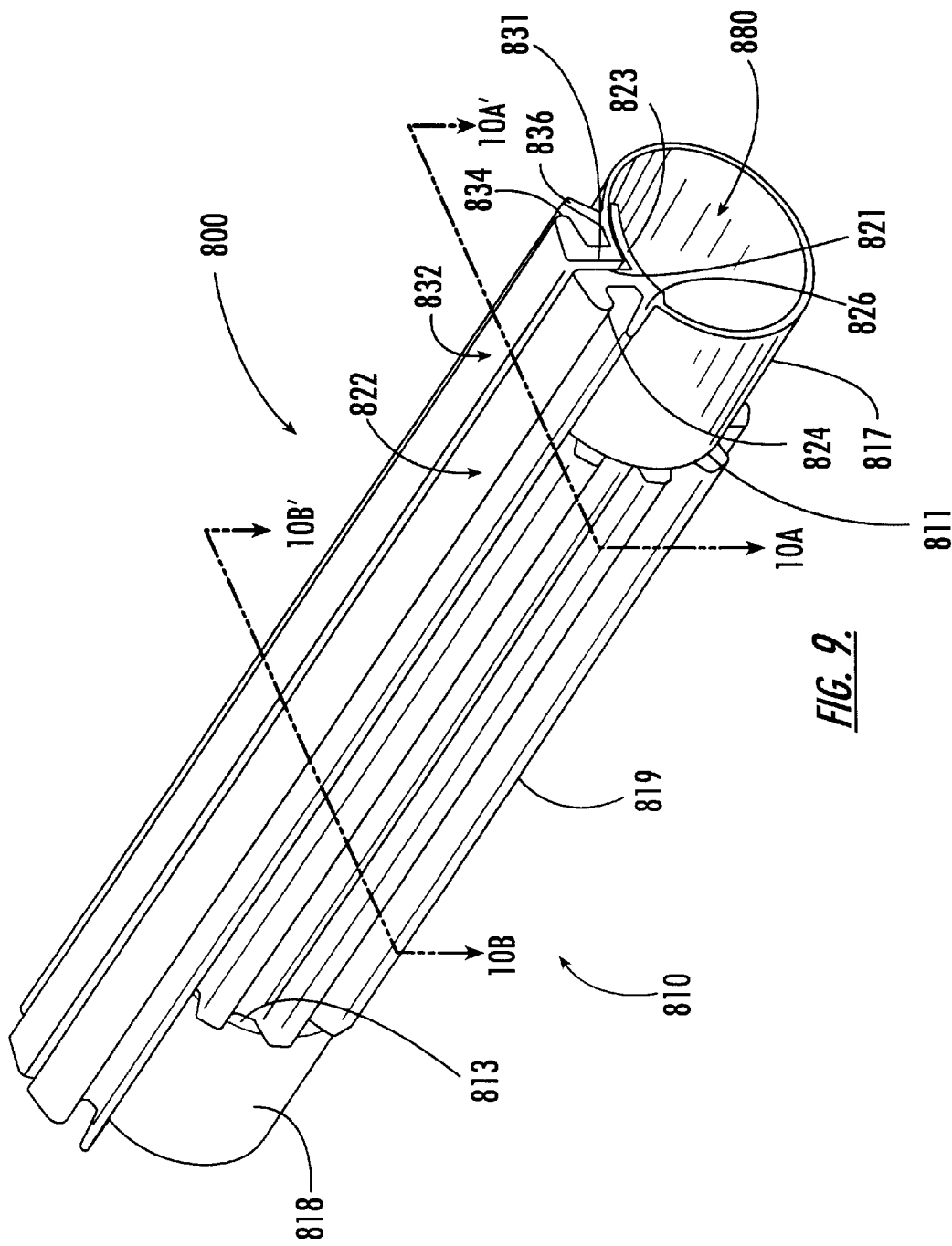
FIG. 9 is a schematic diagram illustrating the illustrated embodiment of FIG. 8 defining a cable chamber with collar portions according to the present invention.

Referring now to FIG. 9, the embodiments of FIG. 8 positioned to define a cable chamber and collars will now be described. The components having reference numerals 819–836 may be described and operate in substantially the same manner as the components having reference numerals 119–136 as described above in FIGS. 1–3 and will not be further described. When wrapped around a cable section, the longitudinally extending body 800 may be positioned as described above in FIG. 3 and shown in FIG. 9 such that the longitudinally extending portion 819 defines a portion of a portion of a cable chamber 880, the first end 811 of the longitudinally extending portion 819 defines the first end of the cable chamber 880 and the second end 813 of the longitudinally extending portion 819 defines the second end of the cable chamber 880. The first end portion 817 defines a first collar portion adjacent the first end of the cable chamber 880. The second end portion 818 defines a second collar portion adjacent the second end of the cable chamber 880. The first and second collar portions each have a radial range taking, as defined below with reference to FIG. 10, of preferably less than about 10%, more preferably less than about 5%, and most preferably less than about 2%.

The present invention will now be described with reference to lateral cross-sections of the embodiments of FIG. 9 as illustrated in FIGS. 10 10A, the end portion 817 defines a collar portion having a substantially flat lateral cross-section. The collar portion extends substantially around a cable section 1020. A sealant material 1010 is positioned between the collar portion and the cable section 1020. While the illustrated embodiment of FIG. 10A shows a sealant material positioned between the collar and the cable section, it is to be understood that the present invention does not require that sealant material be positioned between the collar and the cable section.

In FIG. 10B, the longitudinally extending portion 819 defines a portion of a cable chamber 880. The cable chamber 880 extends substantially around the cable section 1020. The sealant material 1010 is positioned within the cable chamber between the longitudinally extending portion 819 and the cable section 1020. As used herein, a cable section may be a portion of a cable or a connection of two or more cables.

Figure 11B:
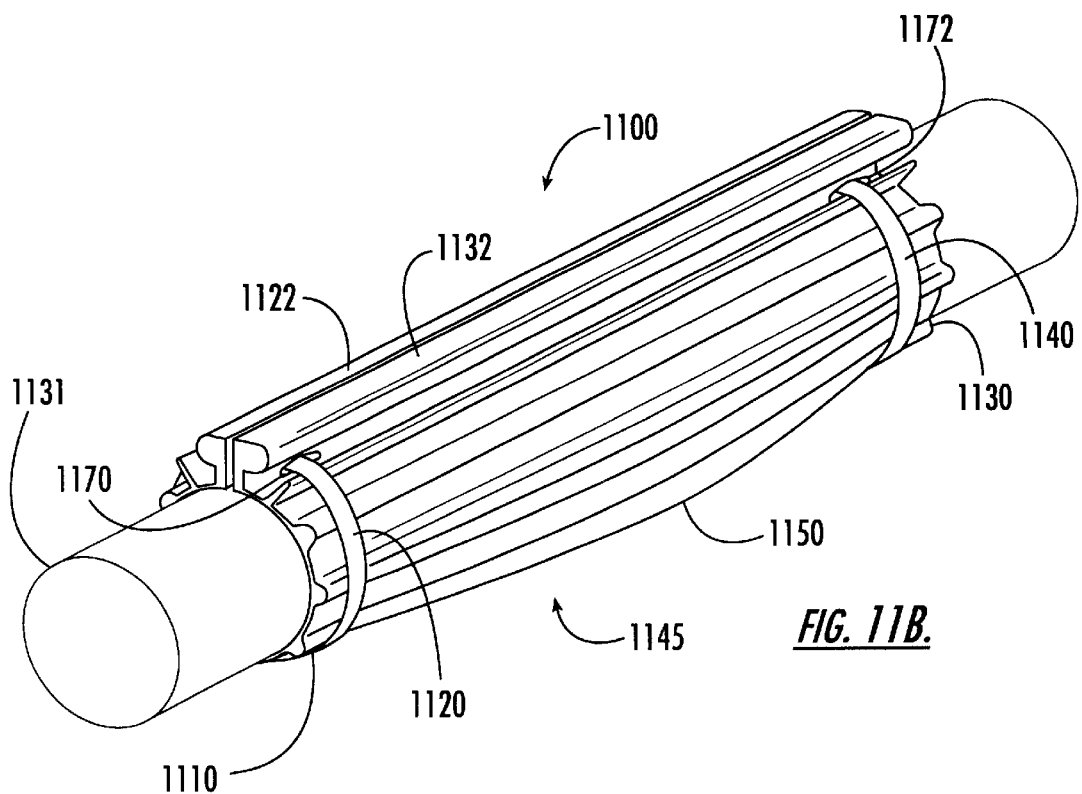
Figure 11C:
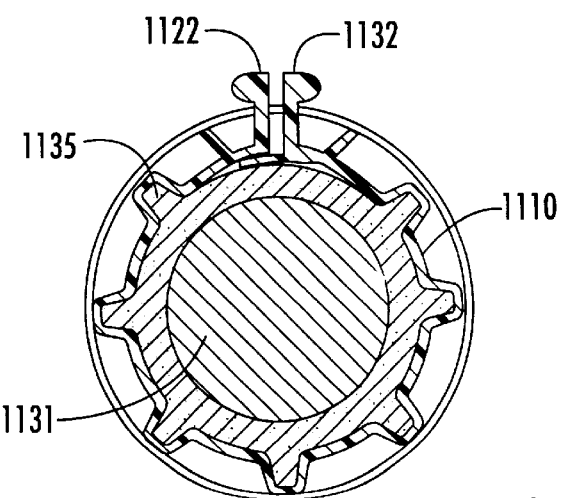

Turning now to FIGS. 11A, 11B, and 11C, embodiments of a wrap-around cable sleeve according to the present invention having first and second restraint members positioned in slots will now be described. As illustrated by the embodiments of FIG. 11A, first and second restraint members 1120 and 1140 are positioned in first and second slots 1160 and 1162. FIG. 11B illustrates embodiments having first and second restraint members 1120 and 1140 positioned in first and second slots 1170 and 1172, respectively. FIG. 11C illustrates a lateral cross-section of the illustrated embodiment of FIG. 11A and FIG. 11B containing sealant material 1135. The wrap-around cable sleeve 1100, as described above with reference to FIGS. 1–3, includes a longitudinally extending body 1145 wrapped around a cable section 1131. The longitudinally extending body 1145 includes a cable chamber 1150 having a first end portion 1110 and a second end portion 1130. The second end portion 1130 is longitudinally spaced from the first end portion 1110.

As shown in FIG. 11A, the first end portion 1110 has a first slot 1160 passing through first and second upright members 1122 and 1132, respectively. The first restraint member 1120 is positioned over the first end portion 1110 of cable chamber 1150 and is positioned in the first slot 1160. The second end portion 1130 has a second slot 1162 passing through first and second upright members 1122 and 1132, respectively. The second restraint member 1140 is positioned over the second end portion 1130 of the cable chamber 1150 and is positioned in the second slot 1162.

As shown in FIG. 11B, the first end portion 1110 has a first slot 1170 passing through first and second upright members 1122 and 1132, respectively. The first restraint member 1120 is positioned over the first end portion 1110 of the cable chamber 1150 and is positioned in the first slot 1170. The second end portion has a second slot 1172 passing through first and second upright members 1122 and 1132, respectively. The second restraint member 1140 is positioned over the second end portion 1130 of the cable chamber 1150 and is positioned in the second slot 1172.

The first restraint member 1120 limits a range taking in a radial direction, as described below with reference to FIG. 12, of the first end portion 1110 to preferably less than about 10%, more preferably less than about 5%, and most preferably less than about 2%. Similarly, the second restraint member 1140 limits a range taking in a radial direction, as described below with reference to FIG. 12, of the second end portion 1130 to preferably less than about 10%, more preferably less than about 5%, and most preferably less than about 2%. The restraint members 1120 and 1140 may be various articles that will reduce the radial range taking of the longitudinally extending portion as will be understood by those of skill in the art, including, but not limited to, tie wraps, spring hose clamps, rope, strap clamps, worm drive hose clamps, and snap hose clamps. When the restraint members are positioned within slots configured as grooves, such as the first and the second slot 1160 and 1162, respectively, as illustrated in the embodiments of FIG. 11A, the restraint members are preferably snap hose clamps. When the restraint members are positioned within slots configured as holes, such as the first and the second slots 1170 and 1172, respectively, as illustrated in the embodiments of FIG. 11B, the restraint members are preferably tie wraps.

Although the illustrated embodiment of FIGS. 11A and 11B show first and second restraint members as having the same configuration, first and second restraint members of the present invention may have different configurations. While the embodiments illustrated in FIGS. 11A and 11B show restraint members positioned in slots, it is to be understood that restraint members of the present invention may be positioned over end portions of wrap-around cable sleeves that do not have such slots. Slots are preferable, however, because they may reduce the likelihood that the restraint member will slip off of the end of the wrap-around cable sleeve. Although the illustrated embodiments of FIGS. 11A and 11B each show first and second slots having the same configuration, it is to be understood that first and second slots of the present invention may also have different configurations. While the illustrated embodiment of FIG. 11C shows the restraint member 1120 to extend substantially entirely around the end portion, restraint members of the present invention may extend only around a portion of the longitudinally extending portion (e.g., by using a c-shaped clamp).

Figure 12:
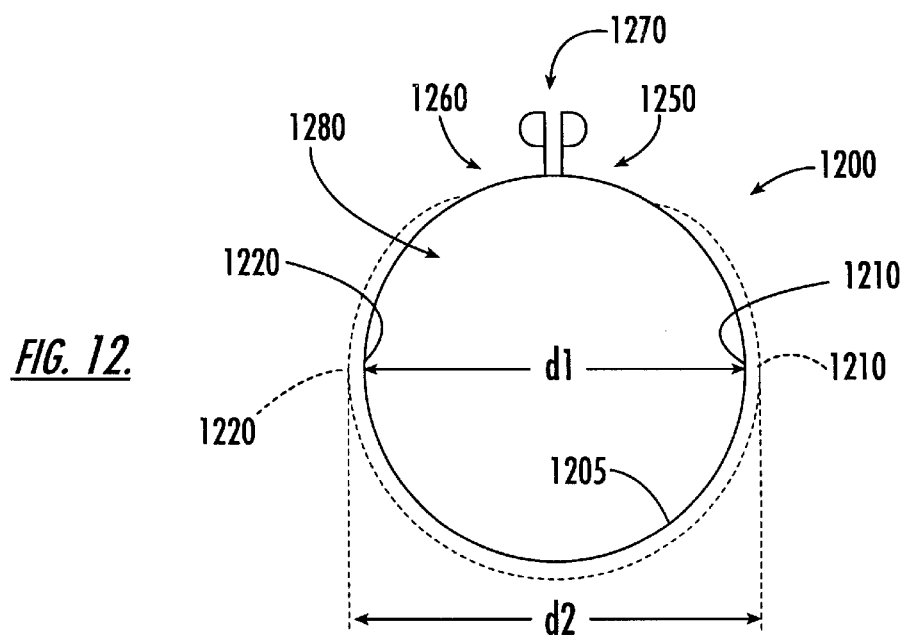
FIG. 12 is a schematic diagram illustrating radial range taking according to the present invention.

Referring now to FIG. 12, a radial range taking according to the present invention will now be described. A lateral cross-section of a wrap-around cable sleeve according to the present invention having a longitudinally extending body 1200 is shown. The longitudinally extending body 1200 has a longitudinally extending portion 1205, which defines a portion of a cable chamber 1280, and a connector 1270 including first and second connecting portions 1250 and 1260, respectively. The cable chamber has an inside diameter $d_1$ as measured from a first point 1210 to a second point 1220 when the cable chamber is in a first position, as represented by the solid lines in FIG. 12. After the cable chamber expands to a second position, as represented by the broken lines in FIG. 12, the cable chamber has an inside diameter $d_2$ as measured from the first point 1210 to the second point 1220. Radial range taking may be defined as the percent change in inside diameter as calculated by the following formula:

$$\text{radial range taking} = [(d_2-d_1)/d_1] \times 100\%$$

Although the illustrated embodiment of FIG. 12 shows the inside diameter measured at two particular points, it is to be understood that the inside diameter can be measured at any two points of the longitudinally extending portion 1205 that define an inside diameter while using the same points for measuring both $d_1$ and $d_2$.

Figure 13:
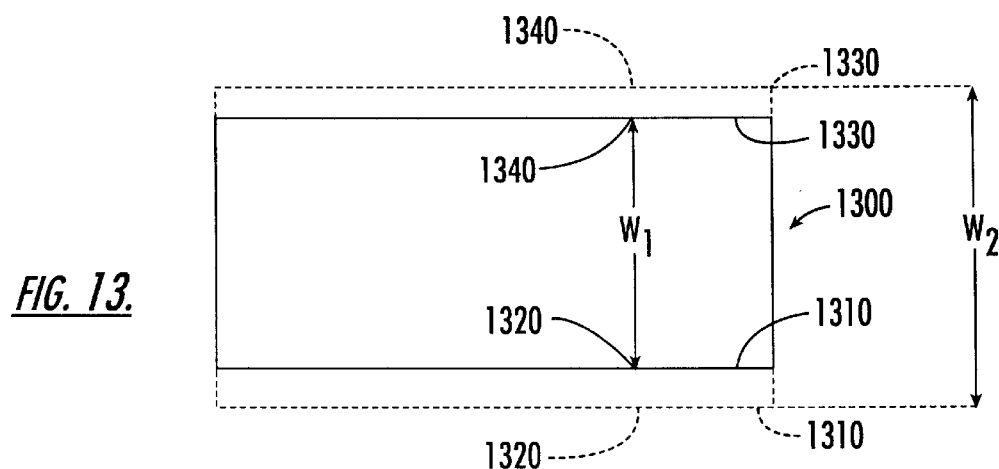
FIG. 13 is a schematic diagram illustrating lateral range taking according to the present invention.

Referring now to FIG. 13, a lateral range taking according to the present invention will now be described. A longitudinally extending portion 1300 has a first longitudinally extending side 1310 and a second longitudinally extending side 1330 laterally spaced from the first longitudinally extending side 1310. The longitudinally extending portion 1300 has a width $w_1$ as measured from a first point 1320 on the first longitudinally extending side 1310 to a second point 1340 on the second longitudinally extending side 1330 when the longitudinally extending portion 1300 is in a first position as represented by the solid lines in FIG. 13. The longitudinally extending portion 1300 has a width $w_2$ as measured from the first point 1320 to the second point 1340 when the longitudinally extending portion 1300 is in a second position represented by the broken lines in FIG. 13. Lateral range taking may be defined as the percent change in width as defined by the following formula:

$$\text{lateral range taking} = [(w_2-w_1)/w_1] \times 100\%$$

While the illustrated embodiment of FIG. 13 shows the width measured at two specific points, it is to be understood that the width can be measured at any two points located directly opposite one another while using the same points for both $w_2$ and $w_1$.

Figure 14:
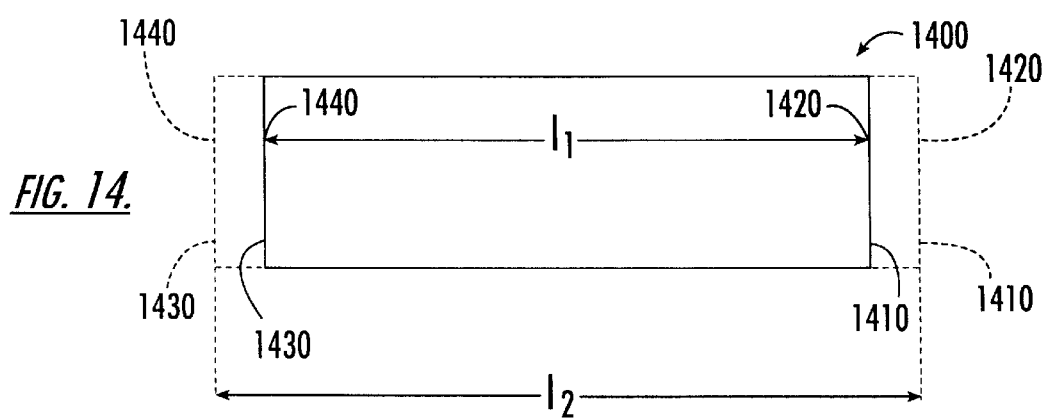
FIG. 14 is a schematic diagram illustrating longitudinal range taking of the present invention.

Turning now to FIG. 14, a longitudinal range taking according to the present invention will now be described. A longitudinally extending portion 1400 has a first end 1410 and a second end 1430 longitudinally spaced from the first end 1410. The longitudinally extending portion 1400 has a length $l_1$ as measured from a first point 1420 on the first end 1410 to a second point 1440 on the second end 1430 when the longitudinally extending portion 1400 is in a first position as represented by the solid lines in FIG. 14. The longitudinally extending portion 1400 has a length $l_2$ as measured from the first point 1420 to the second point 1440 when the longitudinally extending portion 1400 is in a second position represented by the broken lines in FIG. 14. Longitudinal range taking may be defined as the percent change in length as defined by the following formula:

$$\text{longitudinal range taking} = [(l_2-l_1)/l_1] \times 100\%$$

While the illustrated embodiment of FIG. 14 shows the length measured at two specific points, it is to be understood that the length can be measured at any two points located directly opposite one another while using the same points for both $l_1$ and $l_2$.

Figure 15:
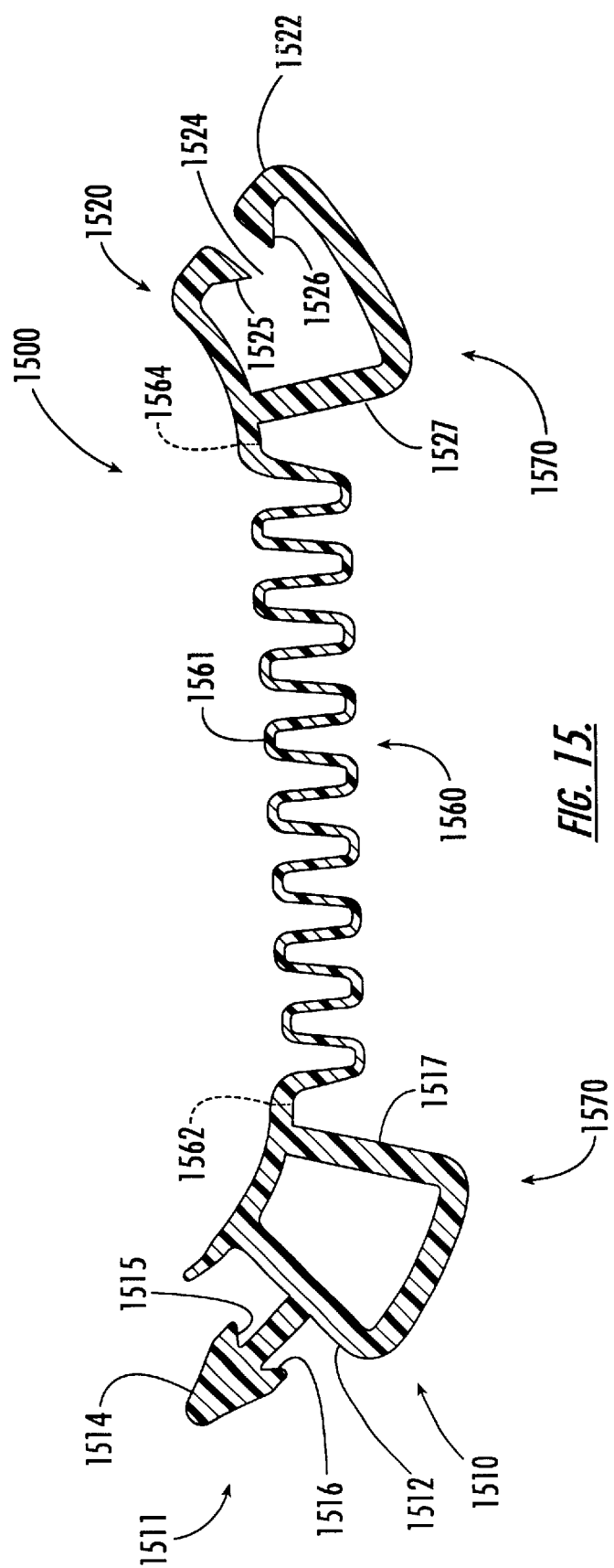
FIG. 15 is a schematic diagram illustrating a lateral cross-section of embodiments of a wrap-around cable sleeve having pin and socket members according to the present invention.

Referring now to FIG. 15, a lateral cross-section of a wrap-around cable sleeve according to the present invention having pin and socket members will now be described. The wrap-around cable sleeve 1500 includes a longitudinally extending body 1560 and a connector 1570. The longitudinally extending body 1560 includes a longitudinally extending portion 1561 having a first longitudinal edge portion 1562 and a second longitudinal edge portion 1564 laterally spaced from the first longitudinal edge portion 1562. The connector 1570 includes a pin member 1510 coupled to and extending from the first longitudinal edge portion 1562 and a socket member 1520 coupled to and extending from the second longitudinal edge portion 1564. While the illustrated embodiment of FIG. 15 shows the pin and socket members to be integrally formed with the longitudinally extending portion, pin and socket members of the present invention may be coupled to first and second longitudinal edge portions by various means as will be understood by those skilled in the art. For example, pin and socket members may be coupled to the first and second longitudinal edge portions using a rail and channel system as described with reference to FIG. 18 below. Pin and socket members may also be coupled to the first and second longitudinal edge portions by bonding the pin and socket members to the first and second longitudinal edge portions. The bonding may be done in various ways as will be understood by those skilled in the art. When the pin and socket members comprise materials different from those of the longitudinally extending portion, the bonding is preferably accomplished by coextruding the pin and socket members with the longitudinally extending portion.

Figure 16:
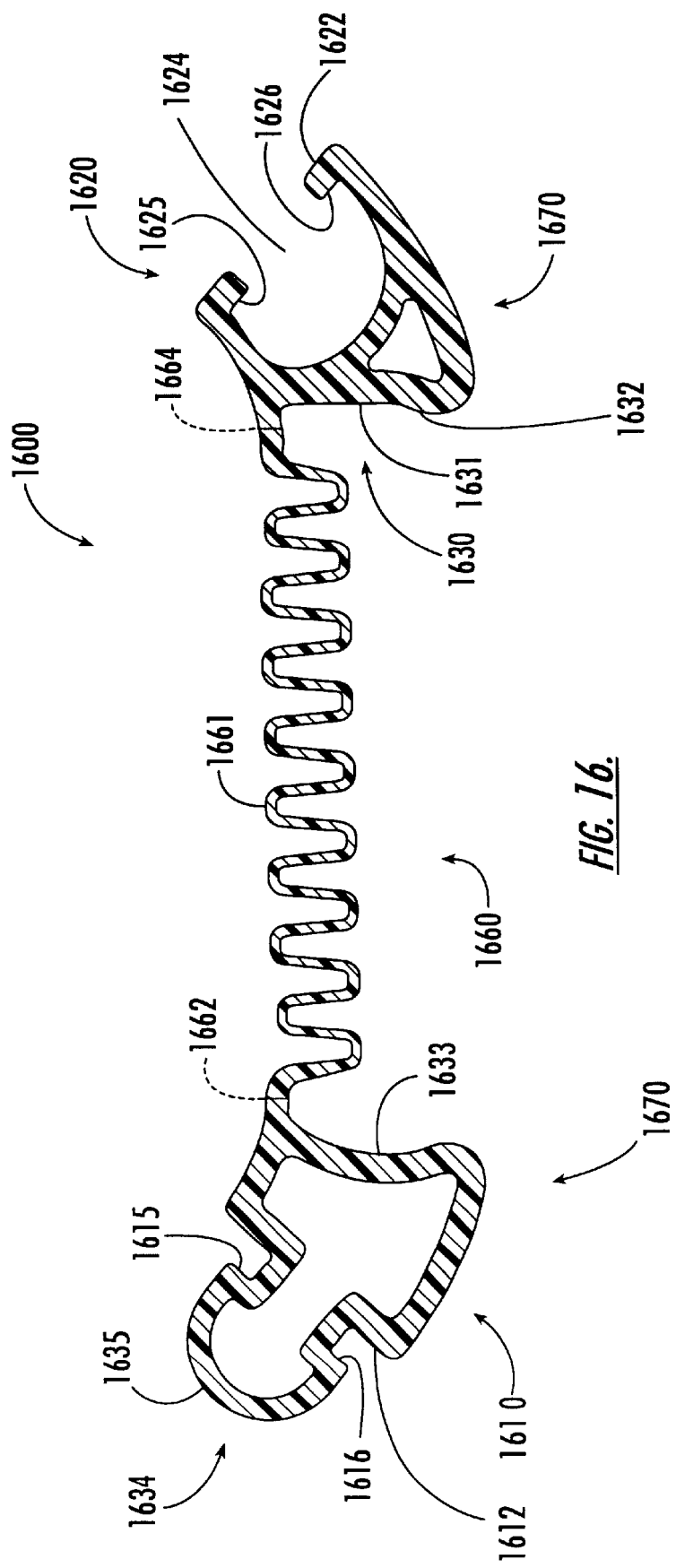
FIG. 16 is a schematic diagram illustrating a lateral cross-section of embodiments of a wrap-around cable sleeve according to the present invention having a pin with a semi-circular leading edge and a grip surface having straight and arcuate portions.
Figure 17:
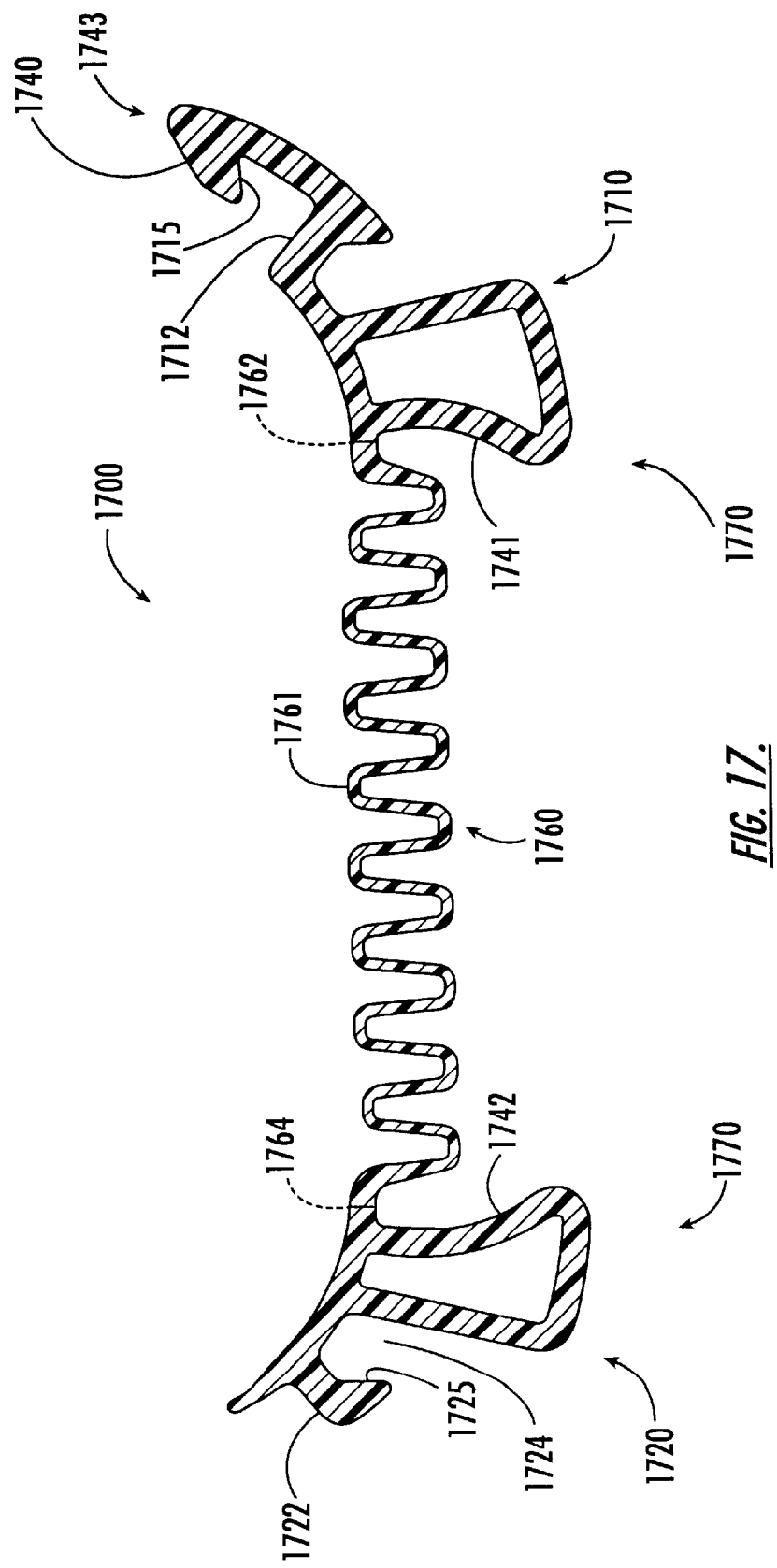
FIG. 17 is a schematic diagram illustrating a lateral cross-section of embodiments of a wrap-around cable sleeve according to the present invention having a pin with a half-arrowhead leading edge and grip surfaces having an arcuate shape.

As shown in FIG. 15, the pin member 1510 includes a pin 1511 extending from a closure side 1512 of the pin member 1510. The pin 1511 has a leading edge 1514 with a tapered profile shown in FIG. 15 as generally an arrowhead shape, a first hook member 1515 and a second hook member 1516. While the illustrated embodiment of FIG. 15 shows a pin having generally an arrowhead shaped leading edge, the leading edge of pins according to the present invention may be a variety of shapes as will be understood by those skilled in the art. For example, as shown in FIG. 16, a wrap-around sleeve 1600 includes a pin 1634 having a leading edge 1635 with a tapered profile having a generally semi-circular shape. The components having reference numerals 1610–1626 and 1660–1670 may be described and operate in substantially the same manner as the components having reference numerals 1510–1526 and 1560–1570 as described herein with reference to FIG. 15. As shown in FIG. 17, a wrap-around sleeve 1700 includes a pin 1740 having a leading edge 1743 with a tapered profile having a generally half-arrowhead shape. The components having reference numerals 1710–1726 and 1760–1770 may be described and operate in substantially the same manner as the components having reference numerals 1510–1526 and 1560–1570 as described herein with reference to FIG. 15

As shown in FIG. 15, the socket member 1520 includes a socket 1524 in a closure side 1522 of the socket member 1520. The socket 1524 is configured to connectably engage with the pin 1511. The socket 1524 includes a first seating element 1525 and a second seating element 1526.

As shown in FIG. 15, the pin and socket members 1510 and 1520 may include grip surfaces 1517 and 1527, respectively, that may aid in wrapping the longitudinally extending body 1500 around a cable section. While the illustrated embodiment of FIG. 15 shows substantially straight grip surfaces extending substantially perpendicularly from the longitudinally extending body, grip surfaces of the present invention may have various other configurations as will be understood by those skilled in the art. For example, as shown in FIG. 16, the grip surface 1630 of the illustrated embodiment has a substantially straight portion 1631 extending from the body 1600 and an arcuate portion 1632 at its distal end. The grip surfaces 1741 and 1742 of the illustrated embodiment of FIG. 17 have a generally arcuate shape.

When the longitudinally extending body 1560 is wrapped around a cable section such that the closure side 1512 of pin member 1510 is positioned adjacent the closure side 1522 of socket member 1520, the pin 1511 may connectably engage the socket 1524 such that the first hook member 1515 is adjacent the first seating element 1525 and the second hook member 1516 is adjacent the second seating element 1526. Although the illustrated embodiments of FIG. 15 shows the pin and socket members extending substantially perpendicularly from the longitudinal extending body, pin and socket members according to the present invention may also extend from the longitudinally extending body at any angle that allows the pin to connectably engage the socket when the body is wrapped around a cable section.

Figure 18:
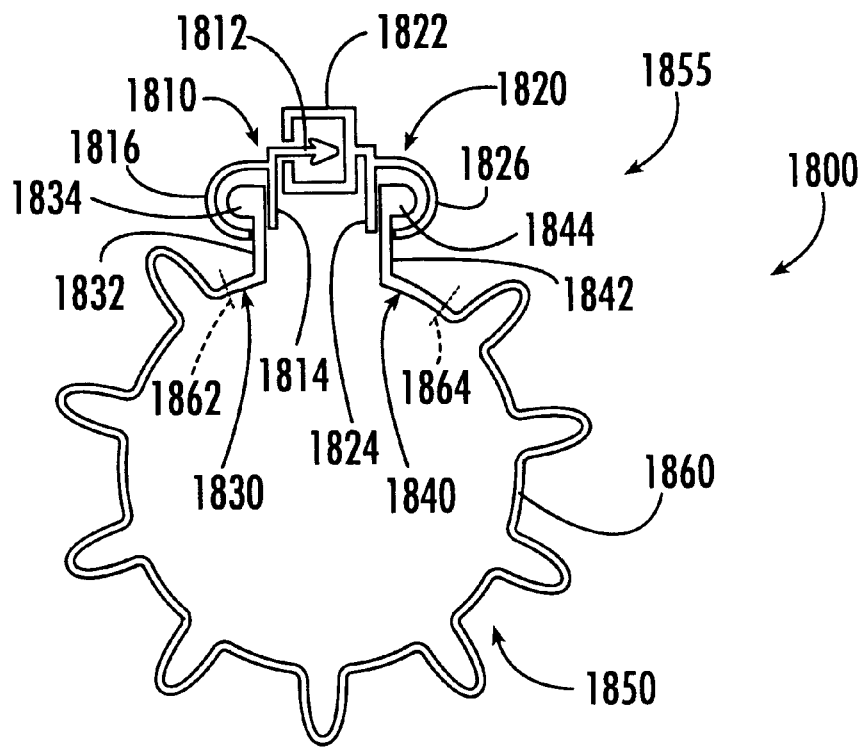
FIG. 18 is a schematic diagram illustrating a lateral cross-section of embodiments of a wrap-around cable sleeve according to the present invention having pin and socket members slidably engaging first and second upright members.

Referring now to FIG. 18, a lateral cross-section of embodiments of a wrap-around cable sleeve according to the present invention having pin and socket members slidably engaging first and second upright members will now be described. The wrap-around cable sleeve 1800 includes a longitudinally extending body 1850 and a connector 1855. The longitudinally extending body 1850 includes a longitudinally extending portion 1860 having a first longitudinal edge portion 1862 and a second longitudinal edge portion 1864 laterally spaced from the first longitudinal edge portion 1862. A connector 1855 includes a pin member 1810 coupled to and extending from the first longitudinal edge portion 1862 and a socket member 1820 coupled to and extending from the second longitudinal edge portion 1864.

As shown in FIG. 18, the pin member 1810 may be coupled to the first longitudinal edge portion 1862 as follows. The connector 1855 has a first connecting portion 1830 adjacent the first longitudinal edge portion 1862. The first connecting portion 1830 has a first upright member 1832. The first upright member 1832 has an increased lateral cross-section at its distal end 1834. The pin member 1810 has, at a first end, a channel defined by a first channel member 1814 and a second channel member 1816. The channel may be configured to slidably engage the distal end 1834 of the second upright member 1832.

As shown in FIG. 18, the socket member 1820 may be coupled to the second longitudinal edge portion 1864 as follows. The connector 1855 has a second connecting portion 1840 adjacent the second longitudinal edge portion 1864. The second connecting portion 1840 has a second upright member 1842. The second upright member 1842 has an increased lateral cross-section at its distal end 1844. The socket member 1820 has, at a first end, a channel defined by a first channel member 1824 and a second channel member 1826. The channel may be configured to slidably engage the distal end 1834 of the second upright member 1832. At an end opposite the first end, the socket member 1820 has a socket 1822 that may be configured to connectably engage the pin 1810 when the pin and socket members 1810 and 1820 are positioned so as to be aligned when the longitudinally extending body 1850 is wrapped around a cable section.

The pin and socket members of the present invention may be made of the same material as the longitudinally extending portion. However, pin and socket members so constructed may have a tendency to disengage when subjected to outwardly directed forces. These forces may occur when sealant material is positioned within the cable chamber and the sealant material undergoes thermal expansion. This tendency may be reduced or eliminated in a variety of ways, a number of which will now be described.

Figure 19:
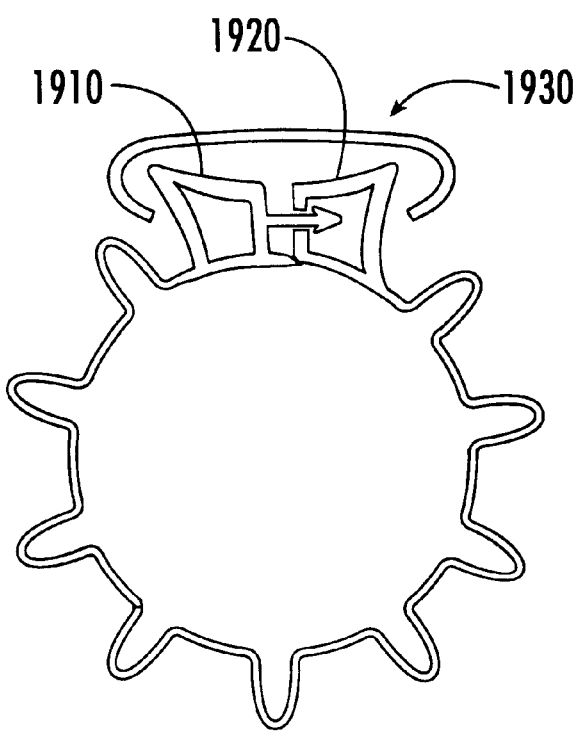
FIG. 19 is a schematic diagram illustrating a lateral cross-section of embodiments of a wrap-around cable sleeve according to the present invention having pin and socket members and a longitudinally extending sleeve connector.

The tendency of pin and socket members to disengage may be reduced or eliminated by providing an additional locking mechanism. As shown by the illustrated embodiment of FIG. 19, the external surfaces of a pin member 1910 and a socket member 1920 may be configured to receive a longitudinally extending sleeve element 1930. The longitudinally extending sleeve element 1930 slidably engages the external surfaces of the pin and socket members 1910 and 1920. While various longitudinally extending sleeve elements known to one skilled in the art may be utilized, the longitudinally extending sleeve element may preferably be as described above with reference to FIG. 3.

Figure 20:
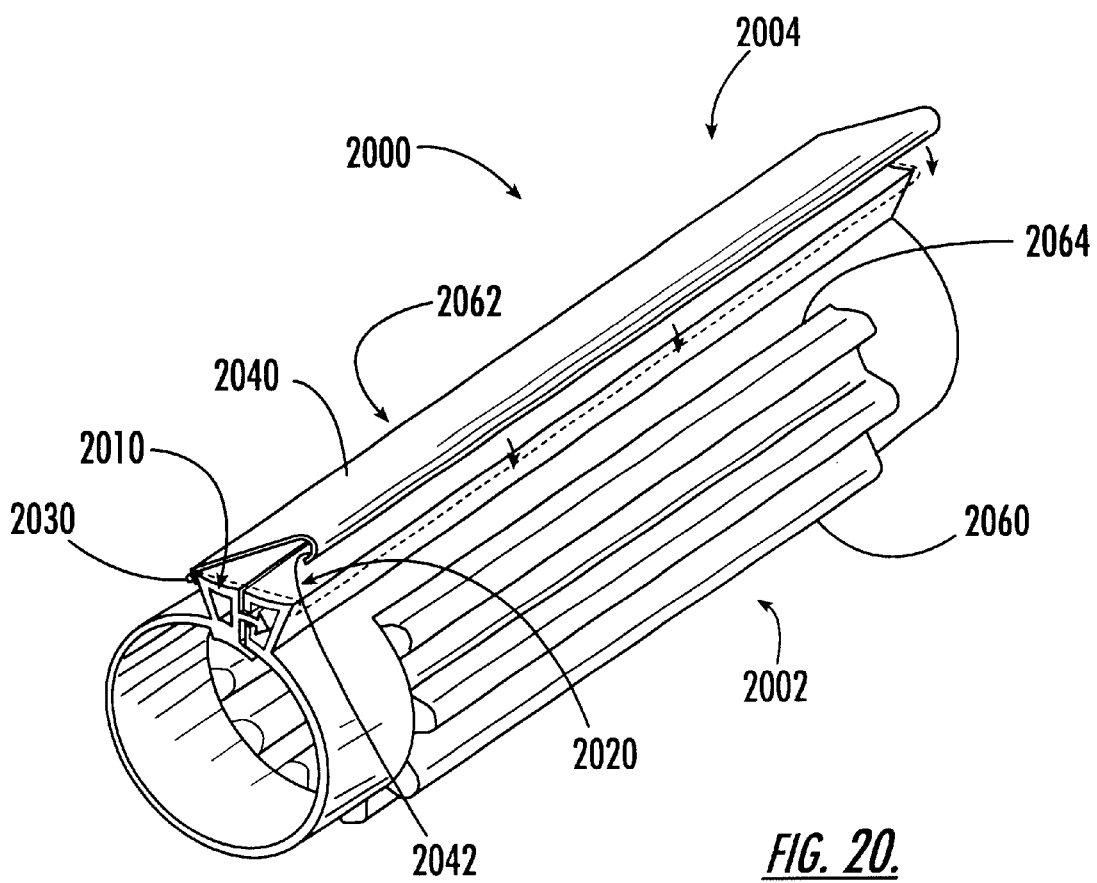
FIG. 20 is a schematic diagram illustrating a lateral cross-section of embodiments of a wrap-around cable sleeve according to the present invention having pin and socket members and a locking member having a living hinge, an arm, and a hook.

As shown by the illustrated embodiment of FIG. 20, a wrap-around cable sleeve 2000 is provided having a longitudinally extending body 2002 and a connector 2004. The longitudinally extending body 2002 has a longitudinally extending portion 2060 having a first longitudinal edge portion 2062 and a second longitudinal edge portion 2064. The connector 2004 has a pin member 2010 coupled to and extending from the first longitudinal edge portion 2062, and a socket member 2020 coupled to and extending from the second longitudinal edge portion 2064. The pin member 2010 extends substantially entirely along the first longitudinal edge 2062 and the socket member 2020 extends substantially entirely along the second longitudinal edge 2064.

As shown in FIG. 20, a living hinge 2030 is pivotally connected to the pin member 2010. An arm 2040 extends from the living hinge 2030. The arm 2040 has a hook 2042 at an end opposite the living hinge 2030. The hook 2042 is configured to engage the socket member 2020 when the arm 2040 is rotated to a position adjacent the socket member 2020, as shown by the broken lines. While the illustrated embodiment of FIG. 20 show the living hinge connected to the pin member and the hook engaging the socket member, it is to be understood that the living hinge may, alternatively, be connected to the socket member and the hook may engage the pin member.

The tendency for the pin and socket members to disengage may also be reduced by providing pin and socket members having a rigidity greater than that of the longitudinally extending portion. For example, pin and socket members of the present invention may comprise a more rigid material. The longitudinally extending portion may comprise a first material as described above while the pin and socket members may comprise a second material that is more rigid than the first material. The second material may comprise thermoplastics, thermosetting plastics, and metals that are more rigid than the first material. The second material may preferably comprise a thermoplastic material, most preferably nylon. The second material has a heat deflection temperature, as measured using ASTM D648@66 psi, of preferably greater than about 100° C., more preferably greater than about 120° C., and most preferably greater than about 150° C. The second material has a flex modulus greater than about 150,000 psi, more preferably greater than about 200,000 psi, and most preferably greater than about 250,000.

Figure 21:
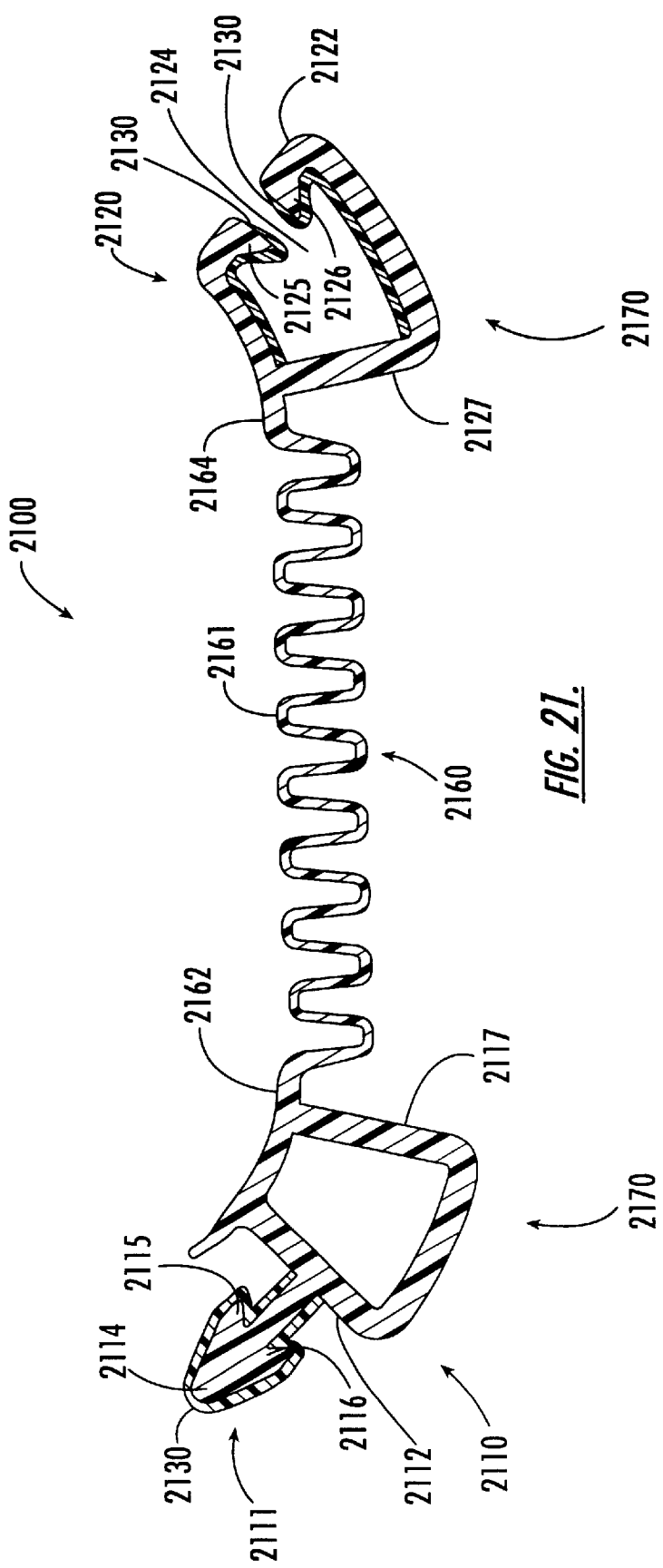
FIG. 21 is a schematic diagram illustrating a lateral cross-section of embodiments of a wrap-around cable sleeve according to the present invention having pin and socket members comprising a rigid coating.

Pin and socket members of the present invention may be coated with a second material that is more rigid than the first material. As shown by the illustrated embodiment of FIG. 21, a rigid coating 2130 may preferably substantially extend over the connectably engaging portions of a pin member 2110 and a socket member 2120. The components having reference numerals 2100–2126 and 2160–2170 may be described and operate in substantially the same manner as the components having reference numerals 1500–1526 and 1560–1570 as described above with reference to FIG. 15.

Figure 22:
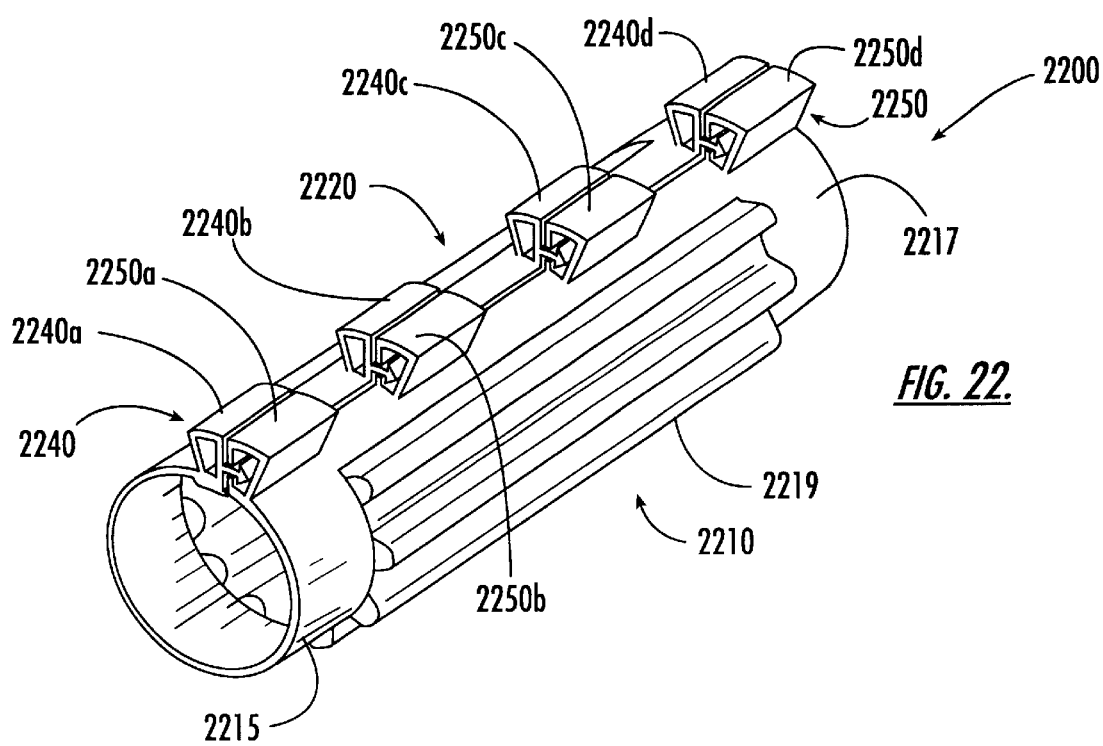
FIG. 22 is a schematic diagram illustrating embodiments of a wrap-around cable sleeve according to the present invention having a plurality of pin and socket members.

Referring now to FIG. 22, embodiments of a wrap-around cable sleeve of the present invention having a plurality of pin and socket members will now be described. The wrap-around cable sleeve 2200 has a longitudinally extending body 2210 and a connector 2220. The longitudinally extending body 2210 has a longitudinally extending portion 2219 and first and second end portions 2215 and 2217, respectively. The connector 2220 has a pin member 2240 having a plurality of longitudinally spaced pin members 2240a through 2240d, and a socket member 2250 having a plurality of longitudinally spaced socket members 2250a through 2250d. The longitudinally spaced pin members 2240a through 2240d and the longitudinally spaced socket members 2250a through 2250d are positioned so as to be aligned to connectably engage when the body 2200 is wrapped around a cable section. While the illustrated embodiments of FIG. 22 show four pin members and four socket members, it is to be understood that a plurality of pin member may comprise two or more pin members and a plurality of socket members may comprise two or more socket members.

Figure 23:
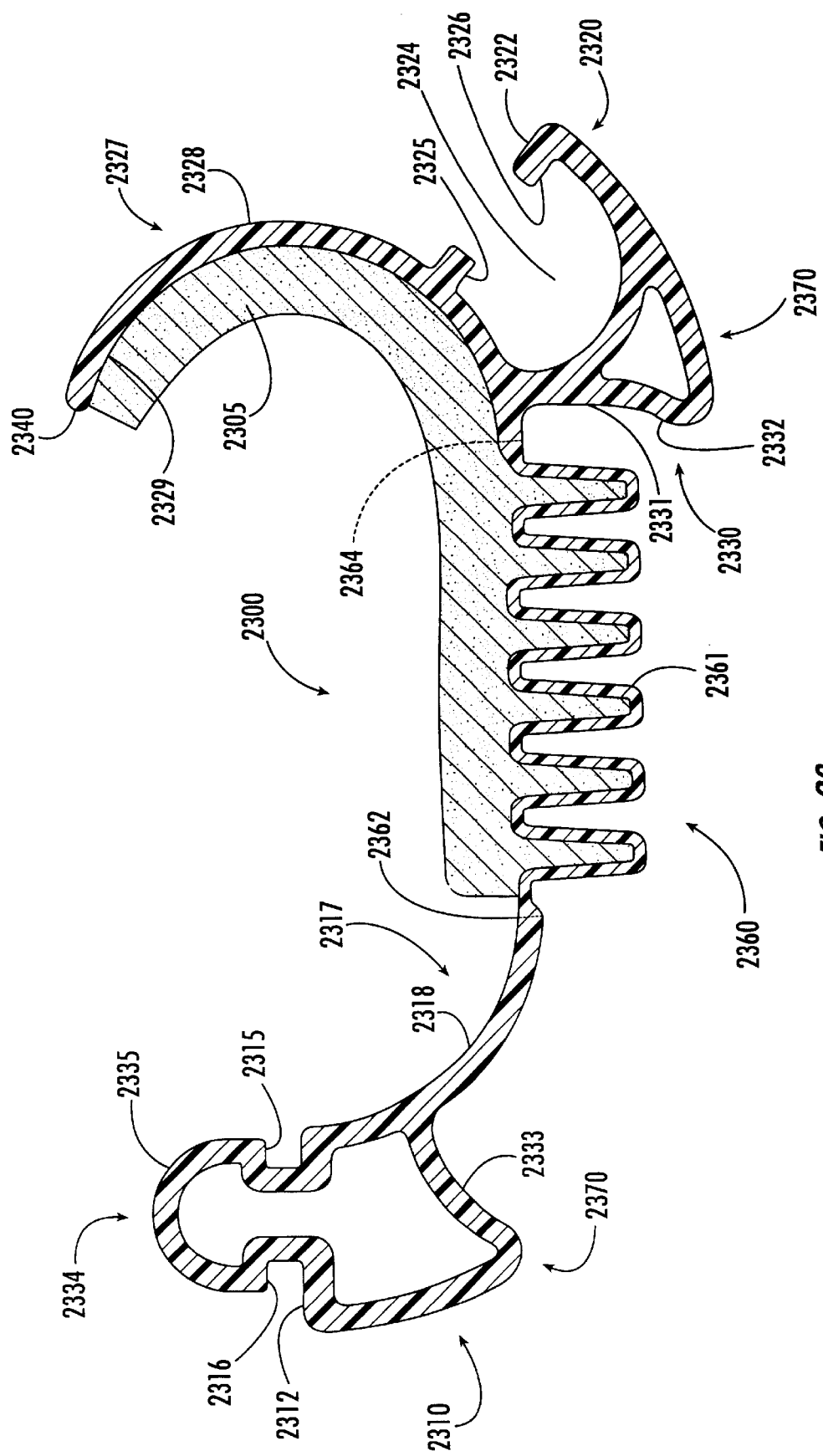
FIG. 23 is a schematic diagram illustrating a lateral cross-section of embodiments of a wrap-around cable sleeve according to the present invention having pin and socket members and a lip member.

Referring now to FIG. 23, a lateral cross-section of embodiments of a wrap-around cable sleeve according to the present invention having pin and socket members and a lip member will now be described. The wrap-around cable sleeve 2300 includes a longitudinally extending body 2360 and a connector 2370. The longitudinally extending body 2360 includes a longitudinally extending portion 2361 with a corrugated lateral cross-section. The longitudinally extending portion 2361 has a first longitudinal edge 2362 and a second longitudinal edge 2364 laterally spaced from the first longitudinal edge 2362. The connector 2370 includes a pin member 2310 coupled to and extending from the first longitudinal edge portion 2362 and a socket member 2320 coupled to and extending from the second longitudinal edge 2364. The components having reference numerals 2310–2316 and 2320–2326 may be described and operate in substantially the same manner as the components having reference numerals 1510–1516 and 1520–1526 described herein with reference to FIG. 15. The components having reference numerals 2330–2335 may be described and operate in substantially the same manner as the components having reference numerals 1630–1635 as described herein with reference to FIG. 16.

As shown in FIG. 23, the pin member 2310 has an inner surface 2318 and a tail member 2317. The tail member 2317 is coupled to the first longitudinal edge 2362. Although the embodiments illustrated in FIG. 23 show a tail member 2317 having a generally arcuate shape, it is to be understood that tail members according to the present invention may have other configurations including a linear configuration; however, a generally arcuate shape is preferred.

As shown in FIG. 23, the socket member 2320 has a lip member 2327 having an outer surface 2328 and an inner surface 2329. The lip member 2327 extends from a closure side 2322 of the socket member 2320 and has a distal end 2340 laterally spaced from the closure side 2322. Although the embodiments illustrated in FIG. 23 show a lip member 2327 having a generally arcuate shape, it is to be understood that lip members according to the present invention may have other configurations including a linear configuration; however, a generally arcuate shape is preferred.

As illustrated in FIG. 23, a sealant material 2305 substantially covers the inner surface 2329 of the lip member 2327 and the inner surface of the longitudinally extending portion 2361. While the embodiments illustrated in FIG. 23 show sealant material 2305 substantially covering these inner surfaces, it is to be understood that sealant material according to the present invention may only cover a portion of these surfaces or may not be present at all. As the wrap-around cable sleeve 2300 is wrapped around a cable section, the outer surface 2328 of the lip member 2327 is positioned adjacent the inner surface 2318 of the pin member 2310. The lip member 2327 preferably contacts the inner surface 2318 of the pin member 2310 before the sealant material begins to be squeezed into a position between a closure side 2312 of the pin member 2310 and the distal end 2340 of the lip member 2327. When the wrap-around cable sleeve 2300 is positioned to substantially surround the cable section such that the pin 2334 is positioned in the socket 2324, the distal end 2340 of the lip member 2327 is preferably adjacent the first longitudinal edge 2362 of the longitudinally extending portion 2361. As the tail member 2317 may comprise a portion of the circumference of the wrap-around cable sleeve, the corrugations are preferably sized to provide the desired range taking.

When a lip member is not present, sealant material 2305 may be positioned inadvertently (i.e. squeezed into a position) between a closure side 2312 of the pin member 2310 and a closure side 2322 of the socket member 2320 as the wrap-around cable sleeve 2300 is wrapped around the cable section. When sealant material 2305 is inadvertently positioned between the closure side 2312 of the pin member 2310 and the closure side 2322 of the socket member 2320, it may become difficult to position the pin 2334 within the socket 2324. The lip member 2327 may reduce or eliminate the amount of sealant material that may otherwise have been squeezed between the closure side 2312 of the pin member 2310 and the closure side 2322 of the socket member 2320 by blocking the escape path of the sealant material 2305.

Methods of forming wrap-around cable sleeves of the present invention may include extruding a web comprising electrically insulating material, applying gel to a surface of the web, and then cutting the web to form a wrap-around cable sleeve having a first and a second end. The extruding step may include extruding a web that includes corrugations defining a corrugated lateral cross-section. The corrugations may provide a lateral range taking of at least about 15%. The extruding step may also include coextruding a rigid thermoplastic and a thermoplastic elastomer to form a web having a longitudinally extending portion comprising the thermoplastic elastomer and a connector comprising the rigid thermoplastic. The extruding step may be performed by any suitable method as will be understood by those skilled in the art. The applying step may be performed by any suitable method as will be understood by those skilled in the art, including, but not limited to spraying, coextruding, laminating, and casting. The cutting step may be performed by any suitable means known to one skilled in the art, and may include cutting the first and second ends simultaneously or in a sequential order.

When the extruded web includes corrugations that define a corrugated lateral cross-section, methods of forming wrap-around cable sleeves of the present invention may also include the step of stamping a portion of the web to substantially remove the corrugations therefrom. The stamping operation is preferably a heat stamping operation. The stamping may be performed before or after cutting, or may be performed substantially concurrently with cutting. If the cutting operation precedes stamping, the stamping operation preferably includes stamping the first and second ends to substantially remove the corrugations therefrom.

Another method of forming a wrap-around cable sleeve of the present invention includes extruding a web comprising electrically insulating material to provide a web that includes corrugations defining a corrugated lateral cross-section which provide a lateral range taking of at least about 15%, cutting the web to form a wrap-around cable sleeve having a first and a second end, and stamping a portion of the web to substantially remove the corrugations therefrom. The extruding, cutting, and stamping operations may be as described above. The stamping operation may also provide first and second ends each having a lateral range taking of less than about 10%. The method may further comprise the step of applying the gel as described above. The gel may be applied before cutting. Alternatively, the cutting may occur before the gel is applied.

EMBODIMENTS WITH A LONGITUDINAL SEALANT CHAMBER

Further embodiments of the present invention, which may be particularly useful for applications in which the cable portion to be sealed has a relatively large diameter (for example, greater than one to two inches in diameter), will now be further described with reference to FIGS. 24–28. As will be described, such embodiments include a sealant chamber (pocket) along a longitudinal edge thereof. In particular, as shown in the figures, the sealant chamber may extend adjacent and parallel to a locking mechanism along the length of the body member of a cable sleeve. Such a sealant chamber may protect the sealant material in the chamber during installation on a cable section by preventing removal of the sealant material when the body member is dragged across the cable section during installation, which may provide an improved seal along the longitudinal edge. In addition, such embodiments may provide for reliable environmental sealing of the cable chamber while using less of the sealant material, which may be particularly beneficial for larger diameter applications as a cost reduction.

Figure 24:
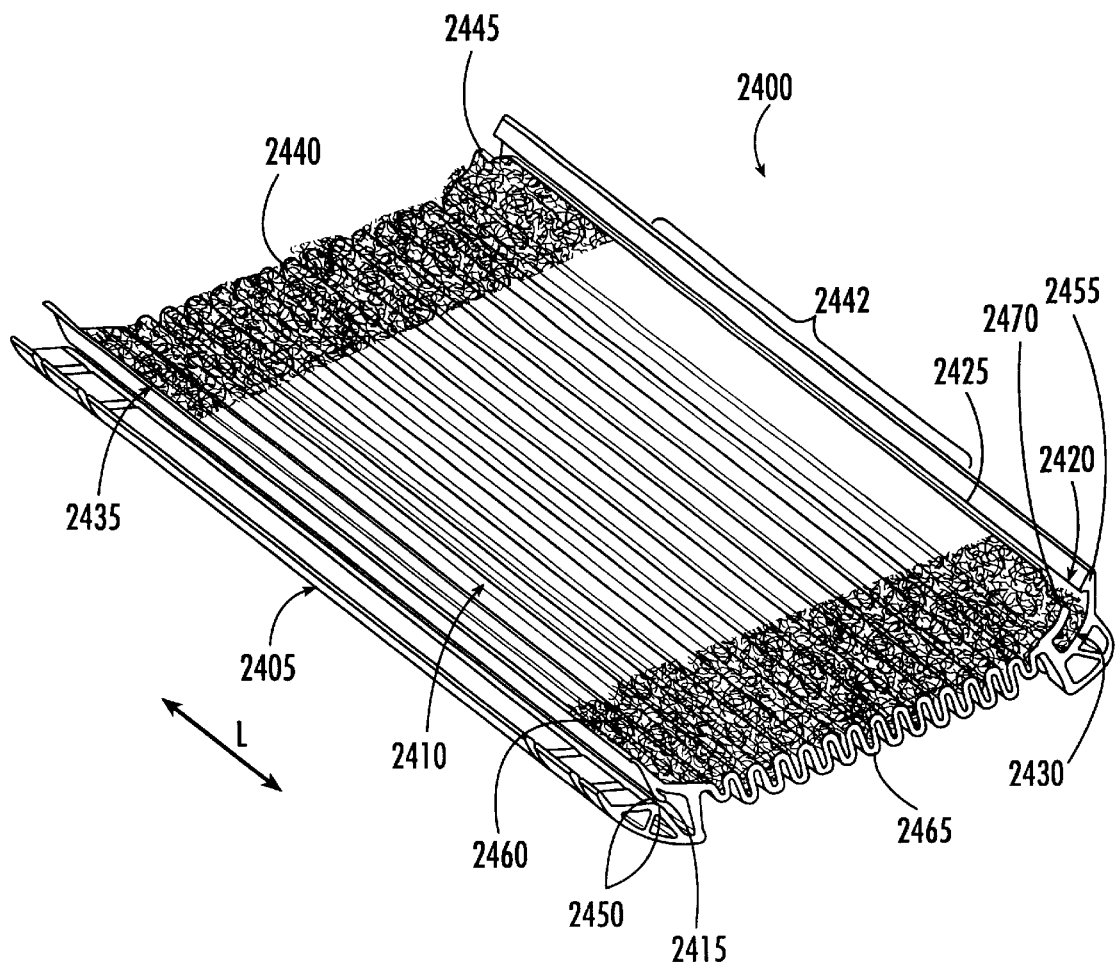
FIG. 24 is a schematic diagram illustrating embodiments of a wrap-around cable sleeve according to the present invention having a sealant material in a sealant chamber along a lateral edge thereof.

Referring now to FIG. 24, a wrap-around cable sleeve 2400 for environmentally sealing a cable section according to embodiments of the present invention will now be described. As shown in FIG. 24, the cable sleeve 2400 includes a wrap-around body member 2405 made from an electrically insulating material. The wrap-around body member 2405 includes a longitudinally (L) extending portion with a corrugated lateral cross section 2410. The longitudinally extending portion 2410 defines at least a portion of a cable chamber for receiving the cable section, the cable chamber extending around the cable section when the body member 2405 is wrapped around the cable section.

A closure edge 2415 extends along a first longitudinal edge of the body member 2405. A sealant chamber 2420 extends along a second longitudinal edge of the body member 2405, opposite from the first longitudinal edge. The sealant chamber 2420 includes a longitudinally extending opening 2425 that is configured to receive the closure edge 2415 when the body member 2405 is wrapped around the cable section. A sealant material 2430 is positioned in the sealant chamber 2420 to environmentally seal the longitudinal edges of the body member 2405 when the body member 2405 is wrapped around the cable section.

As is further illustrated in the embodiments shown in FIG. 24, a first sealant material layer 2435 is provided on the illustrated inner face of the body member 2405 at a first end 2440 of the body member 2405. The sealant material layer 2435 extends transversely substantially across the first end 2440 of the body member 2405 to define a continuous environmental seal between a cable section and the first end 2440 of the body member 2405 when the body member 2405 is wrapped around the cable section. In addition, a second sealant material layer 2460 on the inner face of the body member 2405 is positioned at a second end 2465 of the body member 2405. The second sealant material layer 2460 is longitudinally spaced apart from the first end 2440 to define a gap portion 2442 therebetween from the first end 2440 of the body member 2405. The second sealant material layer 2460 extends transversely substantially across the second end 2465 of the body member 2405 to define a continuous environmental seal between the cable section and the second end 2465 of the body member 2405 when the body member 2405 is wrapped around the cable section.

To provide a continuous seal for the cable chamber of the wrap-around cable sleeve 2400, the first sealant material layer 2435, the second sealant material layer 2460 and the sealant material 2430 positioned in the sealant chamber 2420 sealingly contact each other when the body member 2405 is wrapped around the cable section. More particularly, as shown in the embodiments illustrated in FIG. 24, a first opening 2445 is provided in the inner face of the body member 2405 at the first end 2440 and a second opening 2470 is provided in the inner face of the body member 2405 at the second end 2465. Thus, the first sealant material layer 2440 may sealingly contact the sealing material 2430 through the first opening 2445 and the second sealant material layer 2460 may contact the sealant material 2430 through the second opening 2470.

Figure 25A:
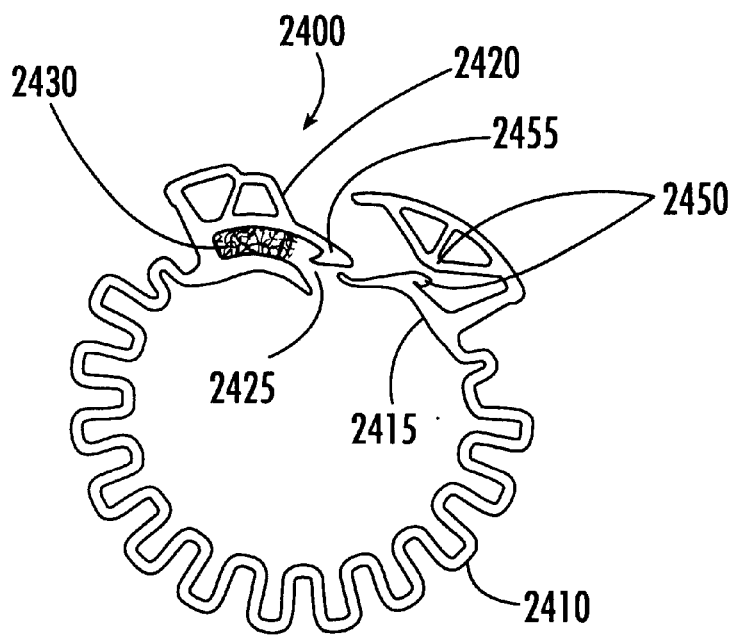
FIGS. 25A and 25B are schematic diagrams illustrating lateral cross-sections of embodiments of a wrap-around cable sleeve according to the present invention as illustrated in FIG. 24 in an opened and closed position, respectively.
Figure 25B:
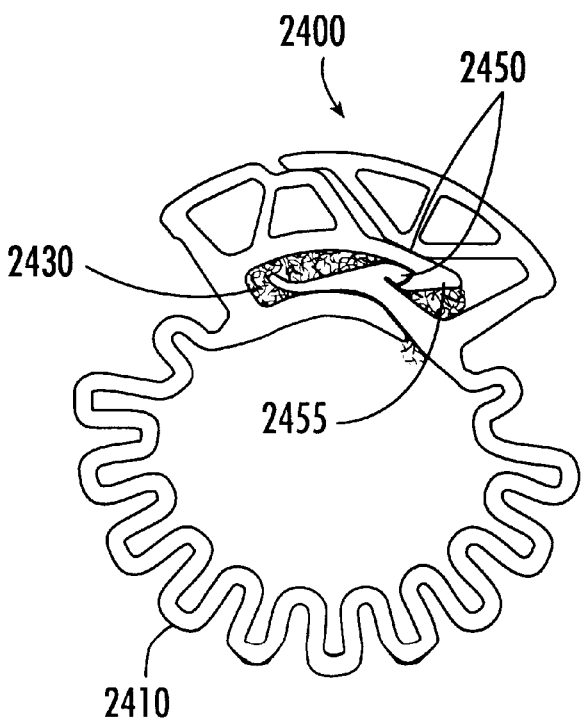

Referring now to FIGS. 25A and 25B, embodiments of the present invention will now be further described with reference to the schematic diagrams illustrating lateral cross-sections of the wrap-around sleeve 2400 in an opened and closed position respectively. As shown in FIG. 25A, the closure edge 2415 includes a locking member 2450. The locking member 2450 is configured to engage a mating portion 2455 of the sealant chamber 2420 when the body member 2405 is wrapped around the cable section. In the particular embodiments illustrated in FIGS. 24, 25A, and 25B, the locking member 2450 and the mating portion 2455 run adjacent and parallel along substantially the entire length of the body member 2405. In particular embodiments of the present invention, the sealant may be, for example, a silicone gel, and the closure edge 2415, as shown in FIG. 25B, may be configured to place the silicone gel 2430 in the sealant chamber 2420 under compression (i.e., elongation as described for preferred embodiments of the gel above) when the body member 2405 is wrapped around the cable section and the closure edge 2415 is received in the opening 2425 of the sealant chamber 2420.

As shown in FIG. 25B, a locking connection is provided by snapping the closure edge 2415 over the mating portion 2455 with the fish hook shape of the mating portion 2455 being engaged by the edges of the locking mechanism 2450 and retained therebetween. While the silicone gel 2430 is shown in FIG. 25B as having a portion of the silicone gel pushed out of the sealant chamber 2420, such an overfilling of the sealant material need not be used.

Figure 26:
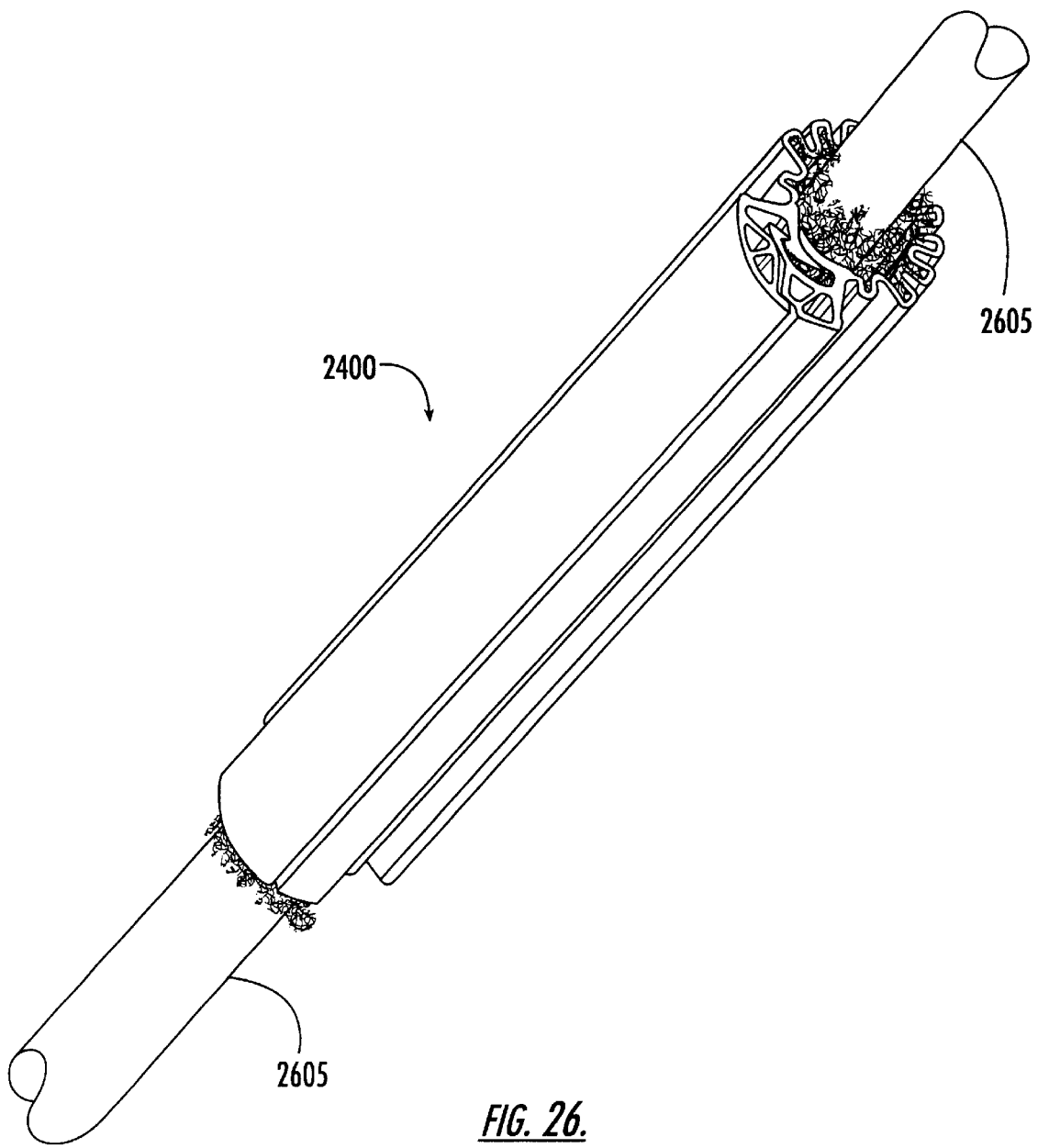
FIG. 26 is a schematic diagram illustrating embodiments of a wrap-around cable sleeve according to the present invention as illustrated in FIG. 24 positioned around a cable section.
Figure 27:
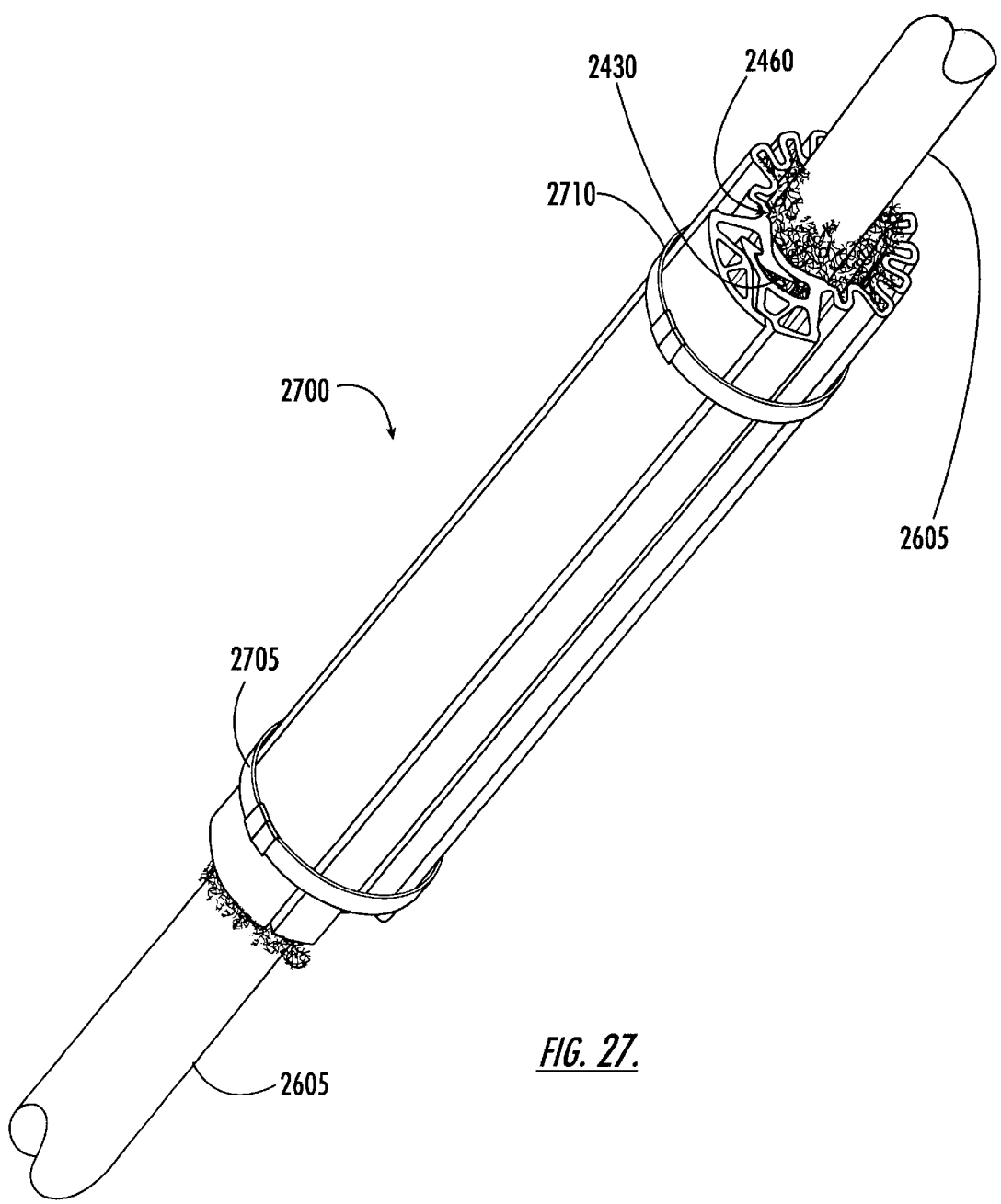
FIG. 27 is a schematic diagram illustrating embodiments of a wrap-around cable sleeve according to the present invention as illustrated in FIG. 24 positioned around a cable section and having restraint members around the ends thereof.

FIG. 26 illustrates embodiments of the wrap-around cable sleeve 2400 in position wrapped around a cable section 2605. FIG. 27 shows further embodiments of a wrap-around cable sleeve 2700 wrapped around a cable section 2605. In the embodiments illustrated in FIG. 27, the wrap-around cable sleeve 2700 further includes a restraint member 2705 around one end of the cable sleeve 2700 and a second restraint member 2710 around the opposite end of the cable sleeve 2700. The restraint members 2705, 2710 are positioned around the ends of the cable sleeve 2700 to limit range taking of the cable sleeve 2700 and/or to compress the sealant material layers 2435, 2460 in the end regions in a radial direction. Thus, restraint members 2705, 2710 may be positioned adjacent the sealant material layers 2435, 2460 to compress the sealant material layers and may thereby effect a moisture seal. As illustrated in the FIGS. 11A and 11B, the restraint members 2705, 2710 may be positioned around the wrap-around cable sleeve 2700 in slots 1160, 1162, 1170, 1172.

Figure 28:
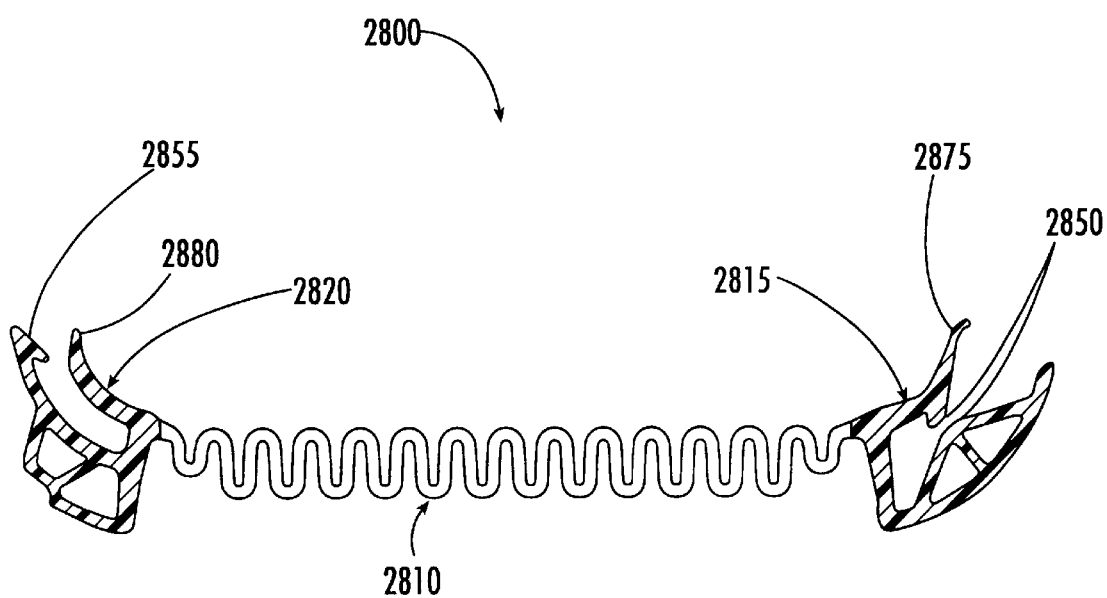
FIG. 28 is a schematic diagram illustrating a lateral cross-section of further embodiments of a wrap-around cable sleeve according to the present invention.

Referring now to FIG. 28, further embodiments of the present invention will now be described. As shown in the embodiments illustrated in the lateral cross section of FIG. 28, the wrap-around cable sleeve 2800 includes a longitudinally extending portion with a corrugated lateral cross-section 2810 made of first polymer, while the sealant chamber 2420 and the closure edge 2415 are made of a second, different (i.e., type and/or formulation) polymer. Thus, the locking member 2850 and the mating portion 2855 may be provided a greater rigidity than the longitudinally extending portion 2810. The first polymer, forming the longitudinally extending portion with a corrugated lateral cross-section 2810, may be a thermoplastic elastomer and the material having a greater rigidity may be a polypropylene.

As is further shown in FIG. 28, the closure edge 2815 includes a contact surface 2875 on the inner face of the cable sleeve 2800. Similarly, the sealant chamber 2820 includes a contact surface 2880 on the inner face of the cable sleeve 2800. The contact surfaces 2875, 2880 are configured to contact the cable section 2605 to facilitate sliding along the cable section 2605 when the wrap-around sleeve 2800 is wrapped around the cable section 2605. Furthermore, the contact surface 2875 of the closure edge 2815 my also operate to compress the sealant material in the sealant chamber when the cable sleeve 2800 is wrapped around the cable section 2605. The contact surface 2880 of the sealant chamber 2820 may further operate to compress the sealant material layers when the cable sleeve 2800 is wrapped around the cable section 2605.

Methods for forming wrap-around cable sleeves 2400, 2700, 2800 as described previously will now be further described. A web of electrically insulating material with a longitudinally extending sealant chamber 2420 therein is extruded. For the embodiments illustrated in FIG. 28, a rigid thermoplastic and a thermoplastic elastomer may be co-extruded to form a web having a body made of the thermoplastic elastomer and having longitudinal edges 2815, 2820 defining the sealant chamber made from a rigid thermoplastic to allow a greater flexibility for expansion of the corrugated body portion 2810. The extruded web is cut to a selected length. After the web is cut to the selected length, the sealant material (or gel) 2430 is inserted into the sealant chamber 2420. In addition, gel is applied to the inner face of the web at first and second ends thereof to define the sealant material layers 2435, 2460. The applied gel contacts the gel in the sealant chamber at each end to form the wrap-around cable sleeve.

As described previously with reference to other embodiments of the present invention, various embodiments of the wrap-around cable sleeves 2400, 2700, 2800 may have a range taking in a radial direction of at least about 15% and the corrugated lateral cross-section may have a flexural modulus of between about 4,000 and 100,000 psi. The cable chamber may have a range taking in a longitudinal direction of less than about 10% and the corrugated longitudinally extending portion may have a 100% tensile modulus of between about 250 psi and 3000 psi. The longitudinally extending portion may also have a tension set less than about 60%.

While embodiments of the present invention including a longitudinal sealant chamber have been generally described above with reference to FIGS. 24–28, it is to be understood that others of the embodiments described above also provide for a longitudinal sealant chamber and may be provided with sealant material layers at the ends thereof as described above with reference to the embodiments shown in FIGS. 24–28. Examples of such alternative embodiments are shown and described with reference to FIGS. 1, 2, 6, 7, 8, 15–21 and 23. It is further to be understood that restraint members 1120, 1140 that may be used with such embodiments are further shown and described with reference to the embodiments shown in FIGS. 11A and 11B. Collar portions 817, 818, 2215, 2217 that may be used with such embodiments are shown and described with reference to the embodiments shown in FIGS. 5A, 8, 9, 20 and 22.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A wrap-around cable sleeve for environmentally sealing a cable section, said wrap-around cable sleeve comprising:

a wrap-around body member comprising an electrically insulating material and having a longitudinally extending portion with a corrugated lateral cross-section, the longitudinally extending portion defining a portion of a cable chamber extending at least substantially around the cable section when the body member is wrapped around the cable section;

a closure edge extending along a first longitudinal edge of the body member;

a sealant chamber extending along a second longitudinal edge of the body member and having an opening configured to receive the closure edge when the body member is wrapped around the cable section;

a sealant material positioned in the sealant chamber to environmentally seal the longitudinal edges of the body member when the body member is wrapped around the cable section; and a first sealant material layer on an inner face of the body member at a first end thereof and extending transversely substantially across the first end of body member to define a continuous environmental seal between the cable section and the first end of the body member when the body member is wrapped around the cable section, wherein the first sealant material layer and the sealant material positioned in the sealant chamber sealingly contact each other when the body member is wrapped around the cable section.

2. The wrap-around cable sleeve of claim 1, wherein the sealant chamber includes an opening in the inner face of the body member at the first end of the body member and wherein the sealant material in the sealant chamber and the first sealant material layer sealingly contact each other through the opening and wherein the sealant material in the sealant chamber is a silicone gel and the closure edge is configured to place the silicone gel in the sealant chamber under compression when the body member is wrapped around the cable section and the closure edge is received in the opening of the sealant chamber.

3. The wrap-around cable sleeve of claim 2 further comprising a restraint member tightened around the first end of the body member when the body member is wrapped around the cable section to place the sealant material layer under pressure in a radial direction.

4. The wrap-around cable sleeve of claim 3 wherein the body member includes a slot in an outer face of the first end of the body member and wherein the restraint member is positioned in the slot when the body member is wrapped around the cable section.

5. The wrap-around cable sleeve of claim 1 wherein the closure edge further comprises a locking member configured to engage a mating portion of the sealant chamber to connect the closure edge and the sealant chamber when the body member is wrapped around the cable section.

6. The wrap-around cable sleeve of claim 5 wherein the longitudinally extending portion with a corrugated lateral cross-section comprises a first polymer having an associated rigidity and wherein the locking member and the mating portion of the sealant chamber comprise a second polymer that provides the locking member and the mating portion of the sealant chamber a greater rigidity than the longitudinally extending portion with a corrugated lateral cross-section.

7. The wrap-around cable sleeve of claim 6 wherein the first polymer is a thermoplastic elastomer and the second polymer is polypropylene.

8. The wrap-around cable sleeve of claim 7 wherein the body member comprises co-extruded thermoplastic elastomer and polypropylene materials.

9. A wrap-around cable sleeve for environmentally sealing a cable section, said wrap-around cable sleeve comprising:

a wrap-around body member comprising an electrically insulating material and having a longitudinally extending portion with a corrugated lateral cross-section, the longitudinally extending portion defining a portion of a cable chamber extending at least substantially around the cable section when the body member is wrapped around the cable section;

a closure edge extending along a first longitudinal edge of the body member;

a sealant chamber extending along a second longitudinal edge of the body member and having an opening configured to receive the closure edge when the body member is wrapped around the cable section;

a sealant material positioned in the sealant chamber to environmentally seal the longitudinal edges of the body member when the body member is wrapped around the cable section;

a first sealant material layer on an inner face of the body member at a first end thereof and extending transversely substantially across the first end of body member to define a continuous environmental seal between the cable section and the first end of the body member when the body member is wrapped around the cable section, and a second sealant material layer on the inner face of the body member at a second end thereof, longitudinally spaced apart from the first end to define a gap portion therebetween, the second sealant material layer extending transversely substantially across the second end of body member to define a continuous environmental seal between the cable section and the second end of the body member when the body member is wrapped around the cable section;

wherein the first sealant material layer and the sealant material positioned in the sealant chamber sealingly contact each other when the body member is wrapped around the cable section and wherein the second sealant material layer and the sealant material positioned in the sealant chamber sealingly contact each other when the body member is wrapped around the cable section.

10. The wrap-around cable sleeve of claim 9 wherein the sealant chamber includes a first opening in the inner face of the body member at the first end of the body member and wherein the sealant material in the sealant chamber and the first sealant material layer sealingly contact each other through the first opening and wherein the sealant chamber includes a second opening in the inner face of the body member at the second end of the body member and wherein the sealant material in the sealant chamber and the second sealant material layer sealingly contact each other through the second opening.

11. The wrap-around cable sleeve of claim 10 further comprising a first restraint member tightened around the first end of the body member and a second restraint member around the second end of the body member when the body member is wrapped around the cable section to place the sealant material layer under pressure in a radial direction.

12. The wrap-around cable sleeve of claim 11 wherein the body member includes a first slot in an outer face of the first end of the body member and a second slot in the outer face of the second end of the body member and wherein the first and second restraint members are positioned in respective ones of the slots when the body member is wrapped around the cable section.

13. The wrap-around cable sleeve of claim 9 wherein the closure edge further comprises a locking member configured to engage a mating portion of the sealant chamber to connect the closure edge and the sealant chamber when the body member is wrapped around the cable section.

14. The wrap-around cable sleeve of claim 13 wherein the longitudinally extending portion with a corrugated lateral cross-section comprises a first polymer having an associated rigidity and wherein the locking member and the mating portion of the sealant chamber comprise a second polymer that provides the locking member and the mating portion of the sealant chamber a greater rigidity than the longitudinally extending portion with a corrugated lateral cross-section.

15. The wrap-around cable sleeve of claim 14 wherein the first polymer is a thermoplastic elastomer and the second polymer is polypropylene.

16. The wrap-around cable sleeve of claim 15 wherein the body member comprises co-extruded thermoplastic elastomer and polypropylene materials.

17. The wrap-around cable sleeve of claim 9 wherein the inner face of the body member includes a gap portion between the longitudinally spaced apart first and second sealant material layers without sealant material thereon and wherein the sealant material and the first and second sealant material layers environmentally seal the cable chamber when the body member is wrapped around the cable section.

18. The wrap-around cable sleeve of claim 9 wherein the cable chamber has a range taking in a radial direction of at least about 15 percent and wherein the longitudinally extending portion with a corrugated lateral cross-section has a flexural modulus of between about 4,000 and 100,000 psi.

19. The wrap-around cable sleeve of claim 9 wherein the sealant material and the first and second sealant material layers comprise a silicone gel and wherein the closure edge is configured to place the silicone gel in the sealant chamber under compression when the body member is wrapped around the cable section and the closure edge is received in the opening of the sealant chamber.

20. The wrap-around cable sleeve of claim 9 wherein the body member further comprises:

a first collar portion adjacent a first end of the cable chamber, the first collar portion having a range taking in a radial direction of less than 10 percent; and a second collar portion adjacent a second end of the cable chamber, the second collar portion having a range taking in a radial direction of less than 10 percent.

21. The wrap-around cable sleeve of claim 9 wherein the cable chamber has a range taking in the longitudinal direction of less than about 10 percent.

22. The wrap-around cable sleeve of claim 9 wherein the longitudinally extending portion has a 100% tensile modulus of between about 250 psi and 3000 psi.

23. The wrap-around cable sleeve of claim 9 wherein the longitudinally extending portion has a tension set less than about 60 percent.

24. The wrap-around cable sleeve of claim 9 wherein the closure edge and the sealant chamber each further comprise a contact surface on the inner face of the body member configured to contact the cable section to faciliate sliding thereon while the body member is wrapped around the cable section.

25. A wrap-around cable sleeve for environmentally sealing a cable section, said wrap-around cable sleeve comprising:

a wrap-around body member comprising an electrically insulating material and having a longitudinally extending portion with a corrugated lateral cross-section, the longitudinally extending portion defining a portion of a cable chamber extending at least substantially around the cable section when the body member is wrapped around the cable section;

a closure edge extending along a first longitudinal edge of the body member;

a sealant chamber extending along a second longitudinal edge of the body member and having an opening configured to receive the closure edge when the body member is wrapped around the cable section;

a silicone gel positioned in the sealant chamber to environmentally seal the longitudinal edges of the body member when the body member is wrapped around the cable section, the closure edge being configured to place the silicone gel in the sealant chamber under compression when the body member is wrapped around the cable section and the closure edge is received in the opening of the sealant chamber;

a first sealant material layer on an inner face of the body member at a first end thereof and extending transversely substantially across the first end of body member to define a continuous environmental seal between the cable section and the first end of the body member when the body member is wrapped around the cable section, the first sealant material layer sealingly contacting the silicone gel in the sealant chamber; and a second sealant material layer on the inner face of the body member at a second end thereof, longitudinally spaced apart from the first end to define a gap portion therebetween, the second sealant material layer extending transversely substantially across the second end of body member to define a continuous environmental seal between the cable section and the second end of the body member when the body member is wrapped around the cable section, the second sealant material layer sealingly contacting the silicone gel in the sealant chamber.

* * * * *